(12) United States Patent
Lefrancois et al.

(10) Patent No.: US 8,608,522 B2
(45) Date of Patent: Dec. 17, 2013

(54) JET PROPULSION UNIT FOR A WATERCRAFT

(75) Inventors: Gilbert Lefrancois, Magog (CA); Real Dupont, St-Elie-d'Orford (CA); Simon Richard, Sherbrooke (CA); Roger Rioux, Sherbrooke (CA)

(73) Assignee: Consortium de Recherche BRP-Universite de Sherbrooke S.E.N.C., Valcourt (CA)

( * ) Notice: Subject to any disclaimer, the term of this patent is extended or adjusted under 35 U.S.C. 154(b) by 180 days.

(21) Appl. No.: 13/097,792

(22) Filed: Apr. 29, 2011

(65) Prior Publication Data

US 2012/0275906 A1 Nov. 1, 2012

(51) Int. Cl.
*B63H 11/113* (2006.01)

(52) U.S. Cl.
USPC ............................................. 440/42

(58) Field of Classification Search
USPC ................................... 440/38, 47
See application file for complete search history.

(56) References Cited

U.S. PATENT DOCUMENTS

| | | | |
|---|---|---|---|
| 3,985,094 A * | 10/1976 | Stricker | 440/47 |
| 6,142,841 A | 11/2000 | Alexander, Jr. et al. | |
| 6,146,219 A | 11/2000 | Blanchard | |
| 6,453,835 B2 | 9/2002 | Fadeley et al. | |
| 6,530,812 B2 * | 3/2003 | Koyano et al. | 440/38 |
| 6,941,195 B2 | 9/2005 | Hamamatsu et al. | |
| 7,500,890 B2 | 3/2009 | Morvillo | |
| 2009/0101056 A1 | 4/2009 | Waldo | |

FOREIGN PATENT DOCUMENTS

WO 2010039952 A1 4/2010

OTHER PUBLICATIONS http://www.hinckleyyachts.com/Jetboats/JetStick.aspx; retrieved on Apr. 27, 2011.

* cited by examiner

*Primary Examiner* — Daniel Venne
(74) *Attorney, Agent, or Firm* — BCF LLP

(57) ABSTRACT

A jet propulsion unit has a water inlet, a pump body, an impeller, and a valve assembly fluidly. The valve assembly has a valve housing having an inlet fluidly connected to the pump body, a first outlet and a second outlet. A valve body is disposed in the valve housing and is movable between first and second positions. In the first position, water from a body of water flows consecutively through the water inlet, the pump body, the inlet of the valve housing, the valve housing and the first outlet of the valve housing. In the second position, water from the body of water flows consecutively through the water inlet, the pump body, the inlet of the valve housing, the valve housing, and the second outlet of the valve housing. A watercraft having the jet propulsion unit is also disclosed.

18 Claims, 19 Drawing Sheets

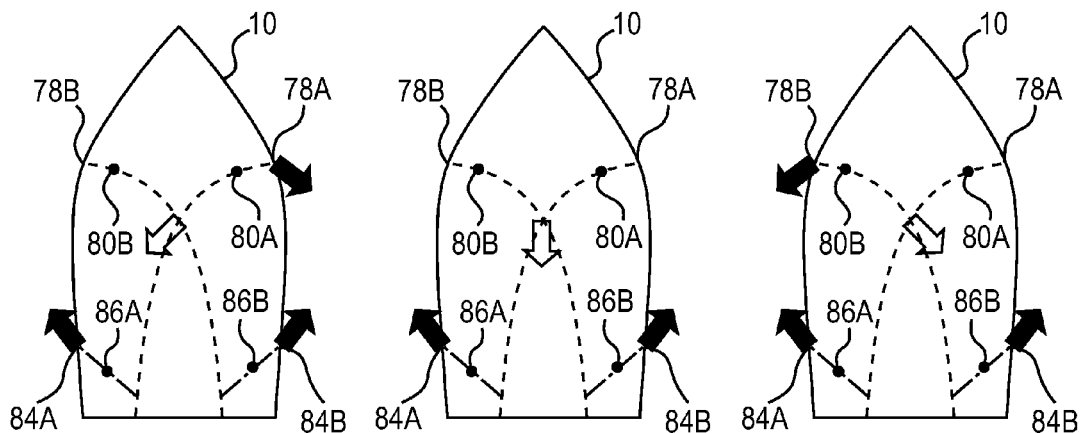
FIG. 19G  FIG. 19H  FIG. 19I
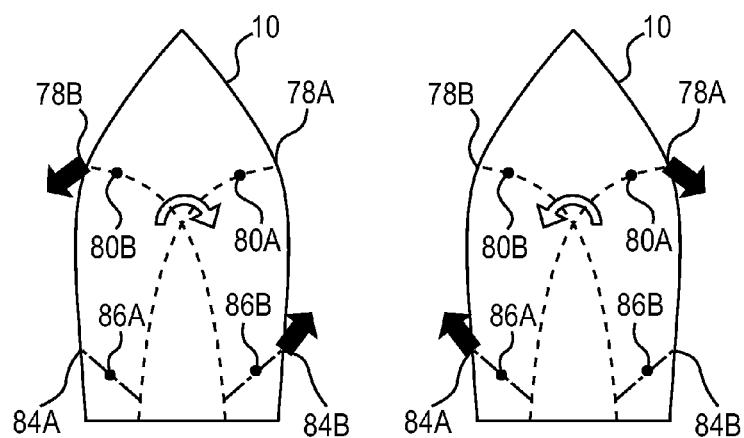
FIG. 19J  FIG. 19K

JET PROPULSION UNIT FOR A WATERCRAFT

FIELD OF THE INVENTION

The present invention relates to a jet propulsion unit for a watercraft and watercraft using same.

BACKGROUND

Some watercraft, typically referred to as jet boats, are propelled by one or more jet propulsion units located at the back of the watercraft. A jet propulsion unit pressurizes water to create thrust. In a jet propulsion unit, water is first scooped from under the hull, is then pressurized by an impeller, and is finally expelled through a venturi. The venturi converges to increase the speed of the jet of water being expelled by the jet propulsion unit. The jet pump unit also includes a steering nozzle in alignment with the venturi. To steer the watercraft, the steering nozzle is turned to redirect the jet of water being expelled from the venturi. Some jet boats are also provided with a reverse gate for each one of its jet propulsion units. When actuated, a reverse gate redirects the jet of water being expelled by the steering nozzle under and toward a front of the watercraft so as to create a rearward thrust to cause the jet boat to move in a reverse direction.

As is the case with any vehicle operating in water, following the application of a force on it (i.e. thrust), a jet boat tends to remain in motion for some time since the water offers little resistance to its movement. Since turning of the jet boat can only be achieved in combination with a forward or rearward thrust, the above tendency of a jet boat to maintain its momentum can make delicate manoeuvring, such as docking the jet boat, somewhat challenging to some boaters. The above situation is exacerbated by the fact that such manoeuvring sometimes need to be made in areas where there are water currents.

Therefore, there is a need for a jet propulsion unit that can be used to facilitate manoeuvring of watercraft such as jet boat.

SUMMARY

It is an object of the present invention to ameliorate at least some of the inconveniences present in the prior art.

In one aspect, the present provides a jet propulsion unit having a water inlet, a pump body fluidly connected to the water inlet, an impeller disposed in the pump body, the impeller being rotatable about an impeller axis, and a valve assembly fluidly connected to the pump body. The valve assembly has a valve housing having an inlet fluidly connected to the pump body, a first outlet and a second outlet. The first outlet defines a first outlet axis. The second outlet defines a second outlet axis. The second outlet axis is at an angle to the first outlet axis. The valve assembly also has a valve body disposed in the valve housing. The valve body is movable between a first position and a second position. In the first position of the valve body, water from a body of water in which the jet propulsion unit is operated flows consecutively through the water inlet, the pump body, the inlet of the valve housing, the valve housing and the first outlet of the valve housing. In the second position of the valve body, water from the body of water flows consecutively through the water inlet, the pump body, the inlet of the valve housing, the valve housing, and the second outlet of the valve housing.

In a further aspect, the valve body has a plurality of third positions intermediate the first and second positions where water from the body of water flows consecutively through the water inlet, the pump body, the inlet of the valve housing and the valve housing, and from the valve housing through both the first and second outlets of the valve housing.

In an additional aspect, the valve assembly also has a discharge conduit connected to the second outlet of the valve housing.

In a further aspect, a steering nozzle is pivotally mounted to the valve housing in alignment with the first outlet about a generally vertical axis.

In an additional aspect, the valve assembly also has a frustoconical conduit connected between the pump body and the inlet of the valve housing. The frustoconical conduit converges from the pump body to the inlet of the pump housing.

In a further aspect, the valve housing includes a first housing portion fastened to a second housing portion. The first housing portion includes the inlet of the valve housing. The second housing portion including the first and second outlets of the valve housing. The frustoconical conduit is integrally formed with the first housing portion. The discharge conduit is integrally formed with the second housing portion.

In an additional aspect, the valve housing includes a first housing portion fastened to a second housing portion. A connection between the first and second housing portions defines a plane. The valve body is pivotable about a valve axis between the first and second positions of the valve body. The valve axis is disposed in the plane.

In a further aspect, the valve housing defines a generally spherical chamber.

In an additional aspect, the edges of the valve body are arcuately shaped to follow a shape of the spherical chamber.

In a further aspect, the valve body is pivotable about a valve axis between the first and second positions of the valve body.

In an additional aspect, the valve axis is horizontal.

In a further aspect, the valve axis intersects the impeller axis.

In an additional aspect, the valve body has a shaft. A central axis of the shaft is the valve axis. A portion of the shaft extends through the valve housing. The jet propulsion unit also has an actuator operatively engaging the portion of the shaft to pivot the valve body between the first and second positions of the valve body.

In a further aspect, the valve body defines a central passage having a passage axis. The passage axis is generally coaxial with the first outlet axis when the valve body is in the first position. When the valve body is in the first position, water from the body of water flows consecutively from the inlet of the valve housing, through the central passage of the valve body and through the first outlet of the valve housing.

In an additional aspect, the passage axis is skewed with respect to the axis of the second outlet when the valve body is in the second position.

In a further aspect, when the valve body is in the second position, water from the body of water flows consecutively from the inlet of the valve housing, over a portion of an outer surface of the valve body and through the second outlet of the valve housing.

In an additional aspect, the valve body includes a pair of deflectors extending from opposite sides of the outer surface of the valve body. The pair of deflectors has the portion of the outer surface therebetween. The pair of deflectors deflecting water toward the second outlet of the valve housing when the valve body is in the second position.

In a further aspect, the valve body is a venturi having a central passage. An inlet of the central passage has a greater diameter than an outlet of the central passage.

In an additional aspect, at least a portion of at least some edges of the valve body are spaced from an inner surface of the valve housing.

In a further aspect, the second outlet of the valve housing is disposed on a top of the valve housing.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 19G is a schematic top plan view of the jet boat of FIG. 1 showing the water jets used to move the jet boat diagonally rearward and toward the left;

FIG. 19H is a schematic top plan view of the jet boat of FIG. 1 showing the water jets used to move the jet boat rearward;

FIG. 19I is a schematic top plan view of the jet boat of FIG. 1 showing the water jets used to move the jet boat diagonally rearward and toward the right;

FIG. 19J is a schematic top plan view of the jet boat of FIG. 1 showing the water jets used to make the jet boat yaw in a clockwise direction; and FIG. 19K is a schematic top plan view of the jet boat of FIG. 1 showing the water jets used to make the jet boat yaw in a counter-clockwise direction.

DETAILED DESCRIPTION

Figure 1:
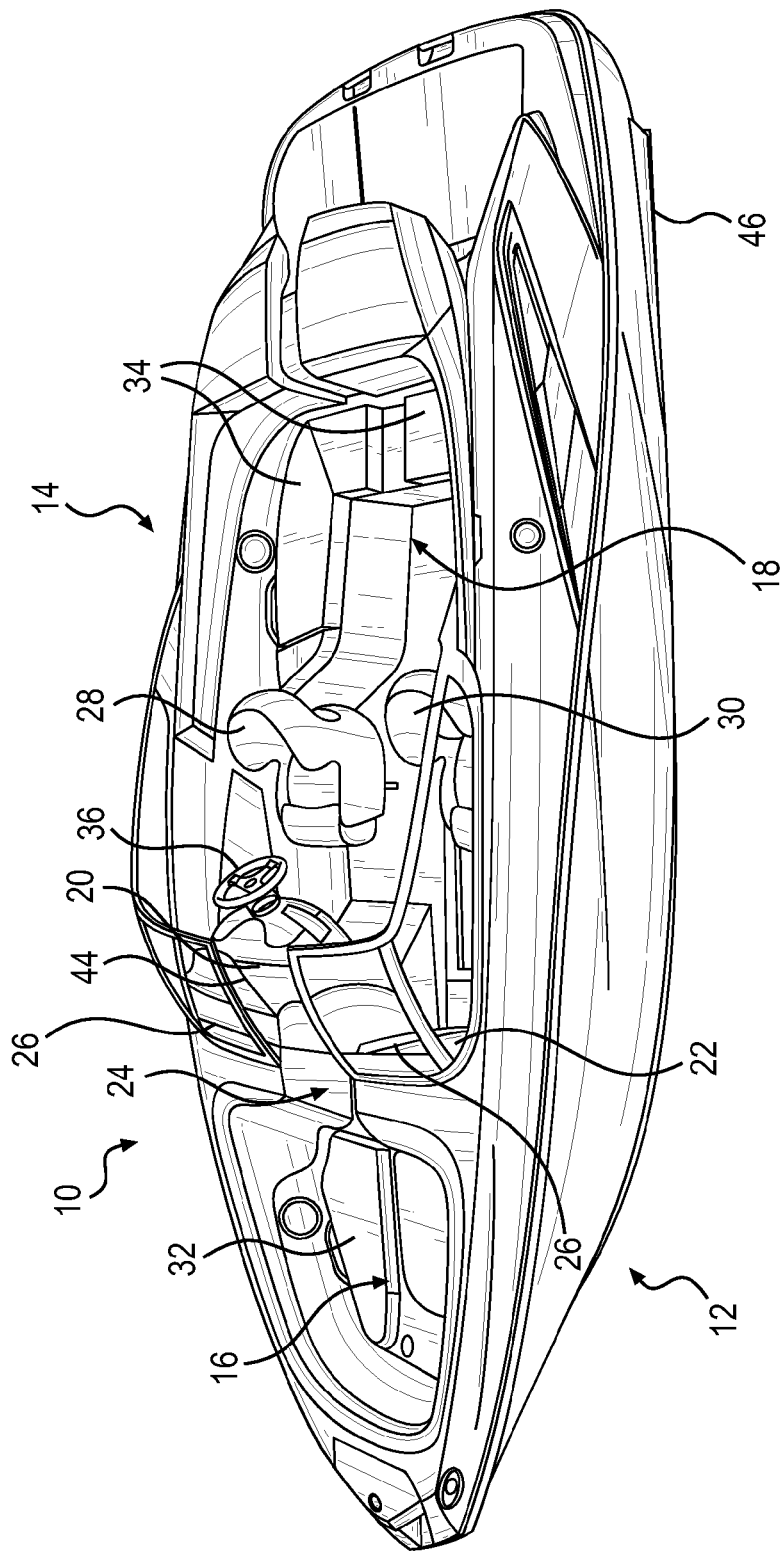
FIG. 1 is a perspective view taken from a left side of a jet boat.
Figure 2:
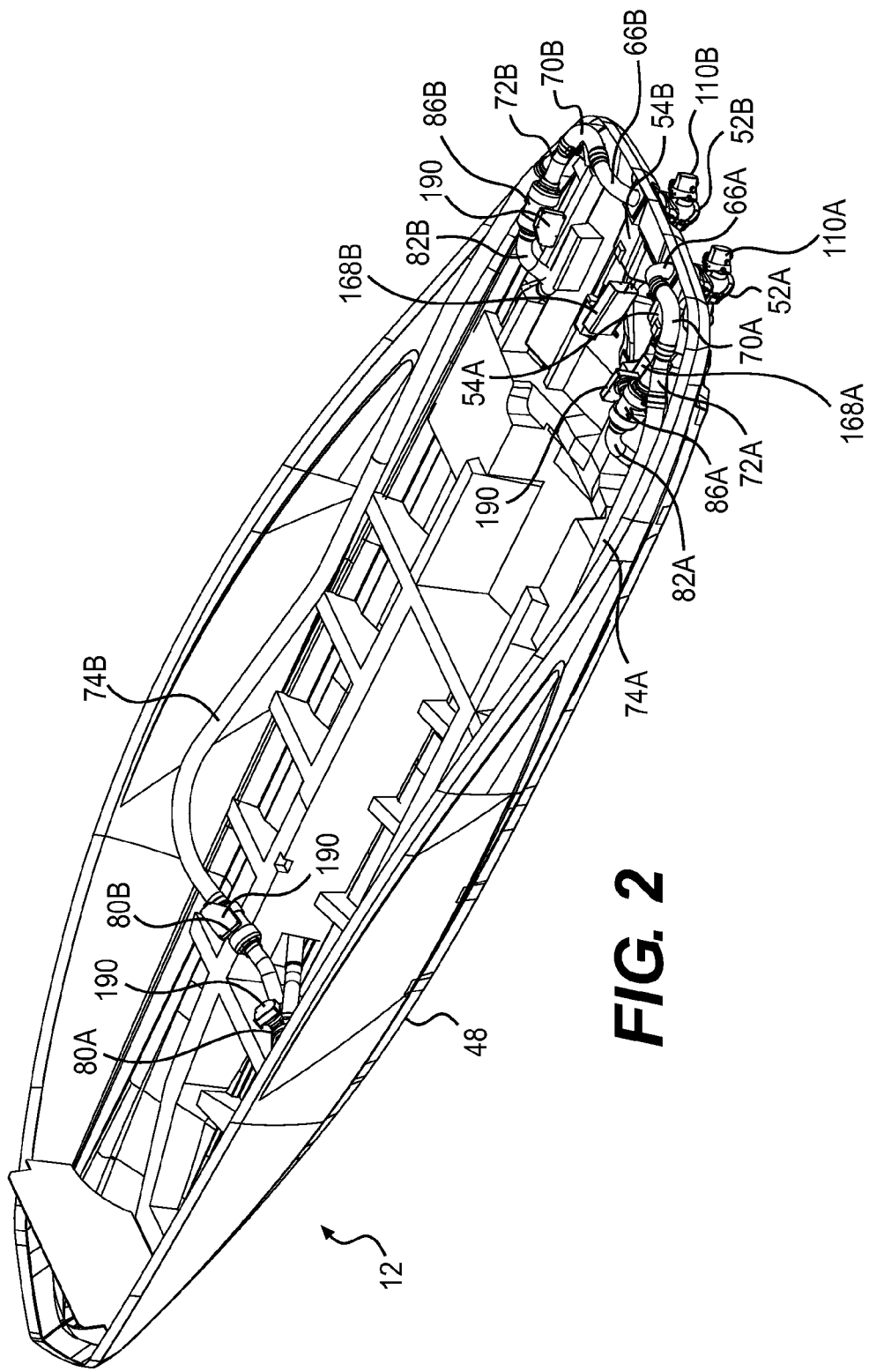
FIG. 2 is perspective view taken from a rear left side of a hull of the jet boat of FIG. 1 with portions of a steering and thrust control system shown therein.

The present invention will be described with respect to a jet boat having two jet propulsion units. However it is contemplated that aspects of the present invention could be applied to other types of watercraft, such as a personal watercraft, and/or to watercraft having only one or more than two jet propulsion units.

The general construction of a jet boat 10 will be described with respect to FIGS. 1 to 5. It should be understood that the jet boat 10 could have a construction other than the one described.

The jet boat 10 has a hull 12 and a deck 14 supported by the hull 112. The deck 14 has a forward passenger area 16 and a rearward passenger area 18. A right console 20 and a left console 22 are disposed on either side of the deck 14 between the two passenger areas 16, 18. A passageway 24 disposed between the two consoles 20, 22 allows for communication between the two passenger areas 16, 18. Windshields 26 are provided over the consoles 20, 22.

A driver seat 28 and a passenger seat 30 are disposed behind the consoles 20 and 22 respectively. Seats 32 and 34 are also provided in the forward and rearward passenger areas 16 and 18 respectively.

The right console 20 is provided with a steering wheel 36, a shift input device in the form of a transmission lever 38 (FIG. 16), a throttle lever 40 (FIG. 16), and a joystick 42 (FIG. 16) used by the driver of the jet boat 10 to control the movement of the jet boat 10 as will be described in greater detail below. The levers 38, 40 and the joystick 42 are located to the right of the steering wheel. It is contemplated that the transmission lever 38 could be replaced by one or more switches or buttons. It is contemplated that the throttle lever 40 could be replaced by a foot actuated pedal. A display area or cluster 44 is located forwardly of the steering wheel 36. The display cluster 44 can be of any conventional display type, including a liquid crystal display (LCD), dials or LED (light emitting diodes). The right console 20 has various buttons (not shown), which could alternatively be in the form of levers or switches, that allow the driver to modify the display data or mode (speed, engine rpm, time . . . ) on the display cluster 44. Additional buttons, switches and levers (not shown) are also provided to allow the driver to control other elements of the boat such as, for example, lights and bilge pumps.

The hull 12 is provided with a combination of strakes 46 and chines 48. A strake 46 is a protruding portion of the hull 12. A chine 48 is the vertex formed where two surfaces of the hull 12 meet. The combination of strakes 46 and chines 48 provide the jet boat 10 with its riding and handling characteristics.

Two engines 50A, 50B (FIG. 3) are located between the hull 12 and the deck 14 at the back of the boat 10. The two engines 50A, 50B power two jet propulsion units 52A, 52B. It is contemplated that, for at least some embodiments, only one engine could power both jet propulsion units 52A, 52B. A majority of the jet propulsion units 52A, 52B is located in recesses formed at the back of the hull 12, and referred to as tunnels 54A, 54B. The jet propulsion units 52A, 52B will be described in greater detail below.

The jet boat 10 includes other features, well known in the art, that will not be described herein, such as the electrical and fuel systems for example. It should be understood that such features are nonetheless present in the boat 10.

Figure 6:
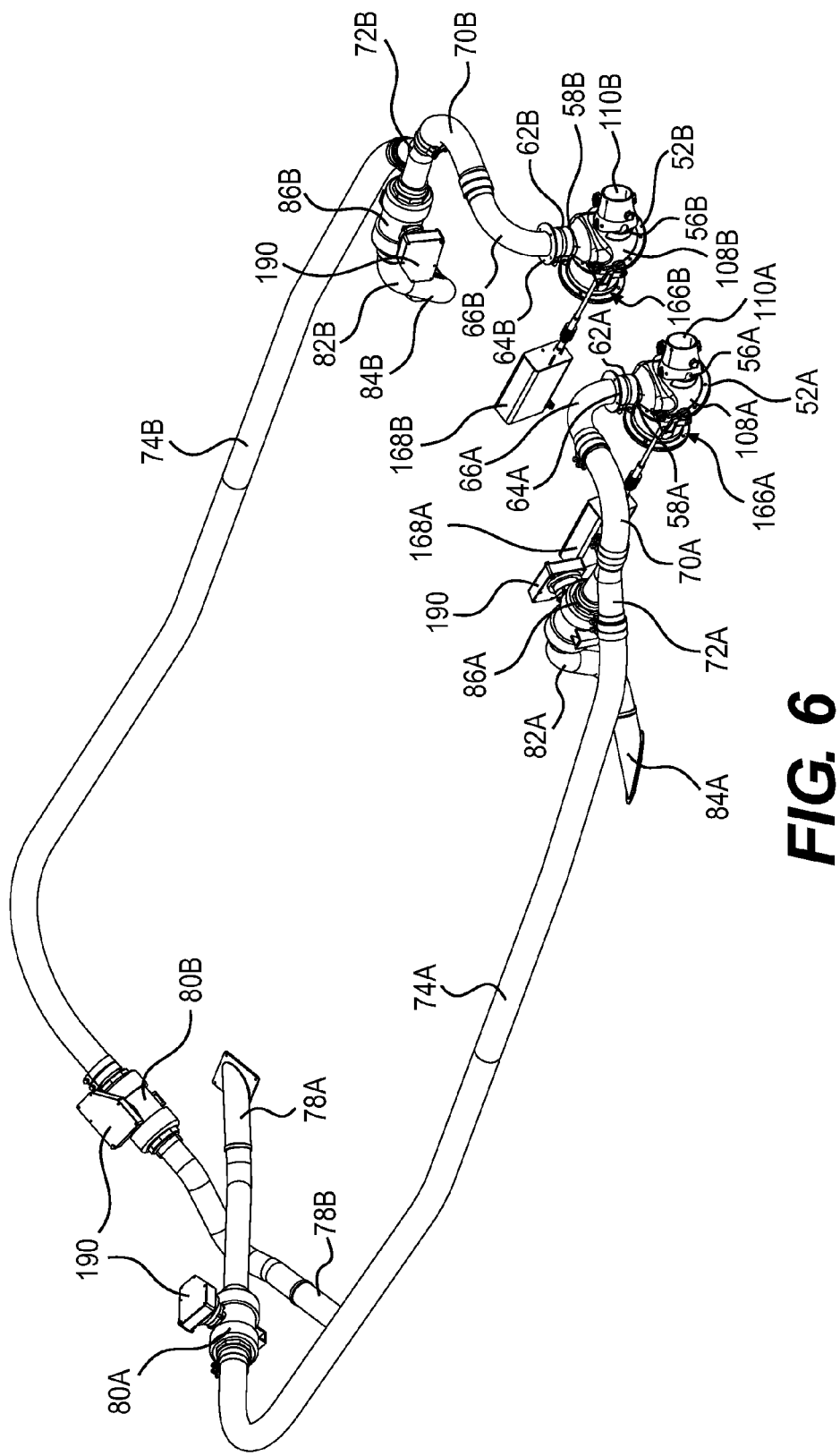
FIG. 6 is a perspective view taken from a rear, left side of the portions of the steering and thrust control system of FIG. 2.

Turning now to FIGS. 2 to 7, the general aspects of the steering and thrust control system of the jet boat 10 will be described. The steering and thrust control system of the jet boat 10 includes the two jet propulsion units 52A and 52B. As can be seen in FIG. 6, the jet propulsion units 52A and 52B each have a main outlet 56A and 56B respectively, and a secondary outlet 58A and 58B respectively. As can be seen, the secondary outlets 58A and 58B are disposed on a top of the jet propulsion units 52A, 52B. It is contemplated that the secondary outlets 58A, 58B could be located on the sides of the jet propulsion units 52A, 52B. The jet propulsion unit 52A has a valve body 60 (FIG. 9) disposed therein that controls through which of the outlets 56A or 58A or both the water is expelled from the jet propulsion unit 52A. The jet propulsion unit 52B also has such a valve. The features and operation of the valve body 60 will be described in greater detail below.

A discharge conduit 62A is connected to the secondary outlet 58A. A flanged collar 64A is connected between the discharge conduit 62A and a top of the tunnel 54A. The flanged collar 64A is disposed around an aperture in the top of the tunnel 54A. A seal (not shown) and/or an adhesive is disposed between a flange of the flanged collar 64A and the top of the tunnel 54A to prevent the entry of water inside the hull 12 via the aperture in the top of the tunnel 54A. A pipe 66A is connected through the top of the tunnel 54A to the flanged collar 64A. From the flanged collar 64A, the pipe 66A extends upwardly above a waterline 68 of the jet boat 10. The pipe 66A then extends toward the left of the boat 10, and then connects to an elbow 70A. A Y-shaped pipe 72A having one inlet and two outlets connects to the elbow 70A. From one of the outlets of the Y-shaped pipe 72A, a pipe 74A extends forwardly and upwardly toward a front of the boat 10, past a longitudinal center of the boat 10. From there, the pipe 74A extends downwardly and toward the right of the boat 10 past the longitudinal centerline 76 and connects to a front right discharge port 78A. A valve 80A is located in this last segment of the pipe 74A to selectively permit or prevent passage of water from the secondary outlet 58A to the discharge port 78A. The valve 80A is disposed above the waterline 68. From the other one of the outlets of the Y-shaped pipe 72A, a pipe 82A extends forwardly, downwardly and toward the left side of the boat 10. The pipe 82A connects to a rear left discharge port 84A disposed rearwardly of a longitudinal center of the boat 10. A valve 86A is located in the pipe 82A to selectively permit or prevent passage of water from the secondary outlet 58A to the discharge port 84A. The valve 86A is disposed above the waterline 68.

Similarly, a discharge conduit 62B is connected to the secondary outlet 58B. A flanged collar 64B is connected between the discharge conduit 62B and a top of the tunnel 54B. The flanged collar 64B is disposed around an aperture in the top of the tunnel 54B. A seal (not shown) and/or an adhesive is disposed between a flange of the flanged collar 64B and the top of the tunnel 54B to prevent the entry of water inside the hull 12 via the aperture in the top of the tunnel 54B. A pipe 66B is connected through the top of the tunnel 54B to the flanged collar 64B. From the flanged collar 64B, the pipe 66B extends upwardly above the waterline 68 of the jet boat 10. The pipe 66B then extends toward the right of the boat 10, and connects to an elbow 70B. A Y-shaped pipe 72B having one inlet and two outlets connects to the elbow 70B. From one of the outlets of the Y-shaped pipe 72B, a pipe 74B extends forwardly and upwardly toward a front of the boat 10, past the longitudinal center of the boat 10. From there, the pipe 74B extends downwardly and toward the left of the boat 10 past the longitudinal centerline 76 and connects to a front left discharge port 78B. A valve 80B is located in this last segment of the pipe 74B to selectively permit or prevent passage of water from the secondary outlet 58A to the discharge port 78B. The valve 80B is disposed above the waterline 68. From the other one of the outlets of the Y-shaped pipe 72B, a pipe 82B extends forwardly, downwardly and toward the right side of the boat 10. The pipe 82B connects to a rear right discharge port 84B disposed rearwardly of a longitudinal center of the boat 10. A valve 86B is located in the pipe 82B to selectively permit or prevent passage of water from the secondary outlet 58B to the discharge port 84B. The valve 86B is disposed above the waterline 68.

It is contemplated that the routing of the pipes from the outlets 58A, 58B to the discharge ports 72A, 72B, 78A, 78B described above could be different than described. Depending of the elements present between the hull 12 and the deck 14, some aspects of the routing would be adapted so as not to interfere with these elements.

Figure 7:
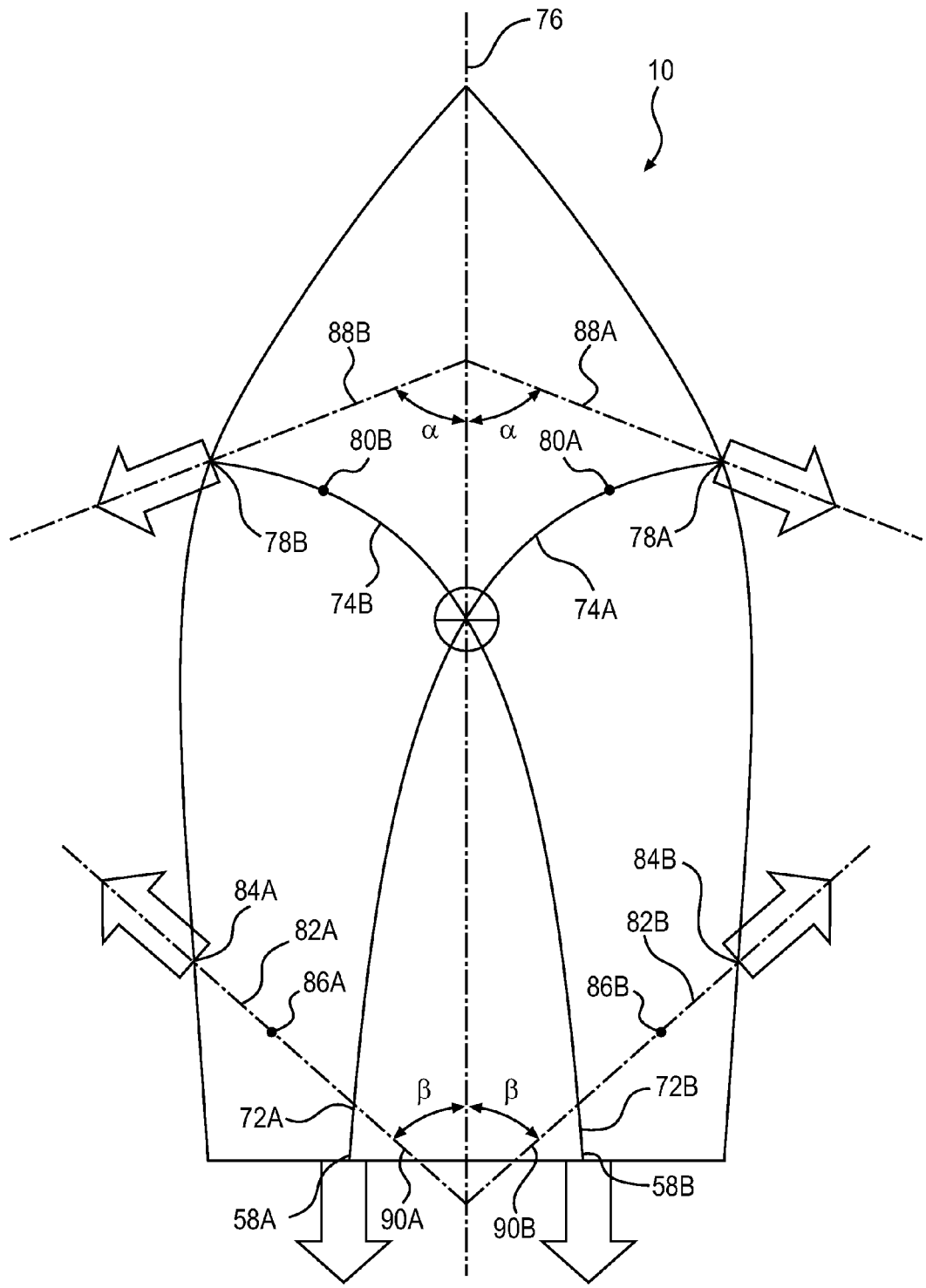
FIG. 7 is a schematic to plan view of the jet boat of FIG. 1 and of portions of the steering and thrust control system of FIG. 2.

As best seen in FIG. 7, the discharge axis 88A of the discharge port 78A (i.e. the axis 88A along which water is expelled from the discharge port 78A) is oriented such that water expelled from the discharge port 78A provides a forward and leftward thrust. The discharge axis 88B of the discharge port 78B is oriented such that water expelled from the discharge port 78B provides a forward and rightward thrust. The discharge axis 90A of the discharge port 84A is oriented such that water expelled from the discharge port 84A provides a rearward and rightward thrust. The discharge axis 90B of the discharge port 84B is oriented such that water expelled from the discharge port 84B provides a rearward and leftward thrust. All of the discharge axes 88A, 88B, 90A, 90B extend downwardly as they extend away from the hull 12 (see FIG. 4). The acute angles $\alpha$ defined between the discharge axes 88A, 88B and the longitudinal centerline 76 of the jet boat 10 are equal. Similarly, the acute angles $\beta$ defined between the discharge axes 90A, 90B and the longitudinal centerline 76 of the jet boat 10 are equal. As can be seen, the angle $\beta$ is less than the angle $\alpha$. However, it is contemplated that the angle $\beta$ could be equal to or greater than the angle $\alpha$.

In an embodiment of the jet boat 10 the angle α is 67 degrees and the angle β is 42 degrees. However, it is contemplated that the angle α could be between 45 and 90 degrees and that the angle β could be between 20 and 65 degrees.

As will be described in greater detail below, by controlling the positions of the valve bodies 60 of the jet propulsion units 52A, 52B and of the valves 80A, 80B, 86A, 86B, the flow of water through the outlets 56A, 56B, 58A 58B and through the discharge ports 78A, 78B, 84A, 84B can be controlled. As a result, the steering and thrust control system of the jet boat 10 can generate thrusts to displace the jet boat 10 in any lateral direction, to rotate the jet boat 10 in any direction about its yaw axis, and combinations thereof. The amount of forward thrust generated through the outlets 56A, 56B depends on the position of the valve bodies 60 of the jet propulsion units 52A, 52B and the speed of the engines 50A, 50B. The amount of thrust generated at the discharge ports 78A, 78B, 84A, 84B also depends on the position of the valve bodies 60 of the jet propulsion units 52A, 52B and the speed of the engines 50A, 50B. As would be understood, when one or more of the valves 80A, 80B, 86A, 86B are closed, no thrust is generated at the one or more corresponding discharge ports 78A, 78B, 84A, 84B. In the present embodiment, the valves 80A, 80B, 86A, 86B have only two positions: opened and closed. It is contemplated that the thrust generated at the discharge ports 78A, 78B, 84A, 84B could additionally be controlled by cycling between the opened and closed positions of their corresponding valves 80A, 80B, 86A, 86B. It is also contemplated that the valves 80A, 80B, 86A, 86B could also have positions intermediate the opened and closed positions, thereby also allowing control of the thrust generated at the discharge ports 78A, 78B, 84A, 84B.

Turning now to FIGS. 4 and 8 to 11, the jet propulsion unit 52A will be described in greater detail. The jet propulsion unit 52B is identical to the jet propulsion unit 52A and as such will not be described in detail herein. Where they are visible in the enclosed figures, the elements of the jet propulsion unit 52B which are the same as those of the jet propulsion unit 52A which are labelled with a reference numeral followed by the suffix A, have been labelled with the same reference numeral but with the suffix B. It is contemplated that the jet propulsion unit 52B could be different from the jet propulsion system 52A. For example, the impeller of the jet propulsion unit 52B could be arranged to rotate in a direction opposite to the direction of rotation of the impeller of the jet propulsion unit 52A and/or the actuation system used to move the valve bodies 60 could be disposed on a right side of the jet propulsion unit 52B while it is located on the left side of the jet propulsion unit 52A.

Figure 4:
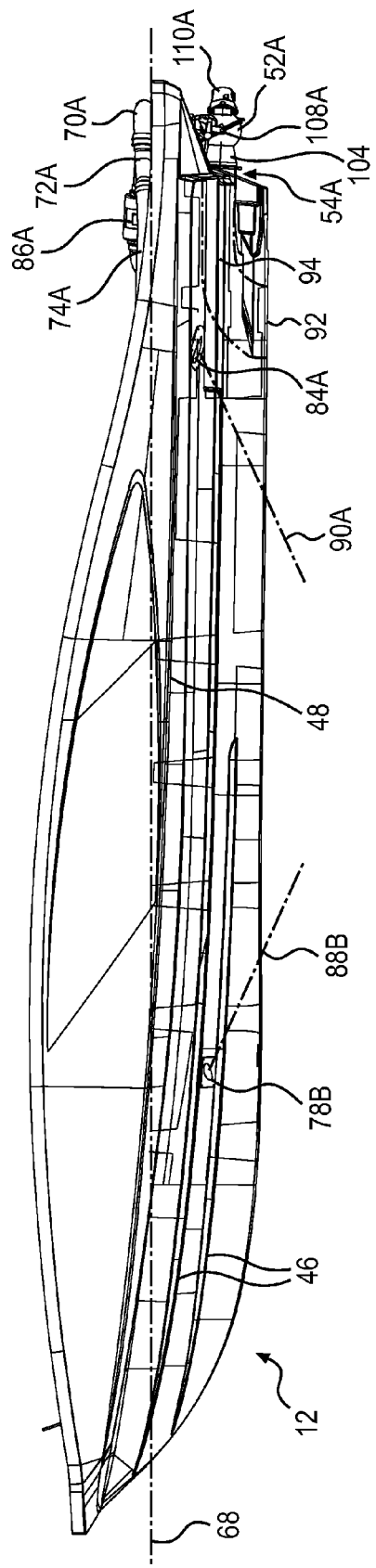
FIG. 4 is a left side elevation view of the hull and of the portions of the steering and thrust control system of FIG. 2.
Figure 5:
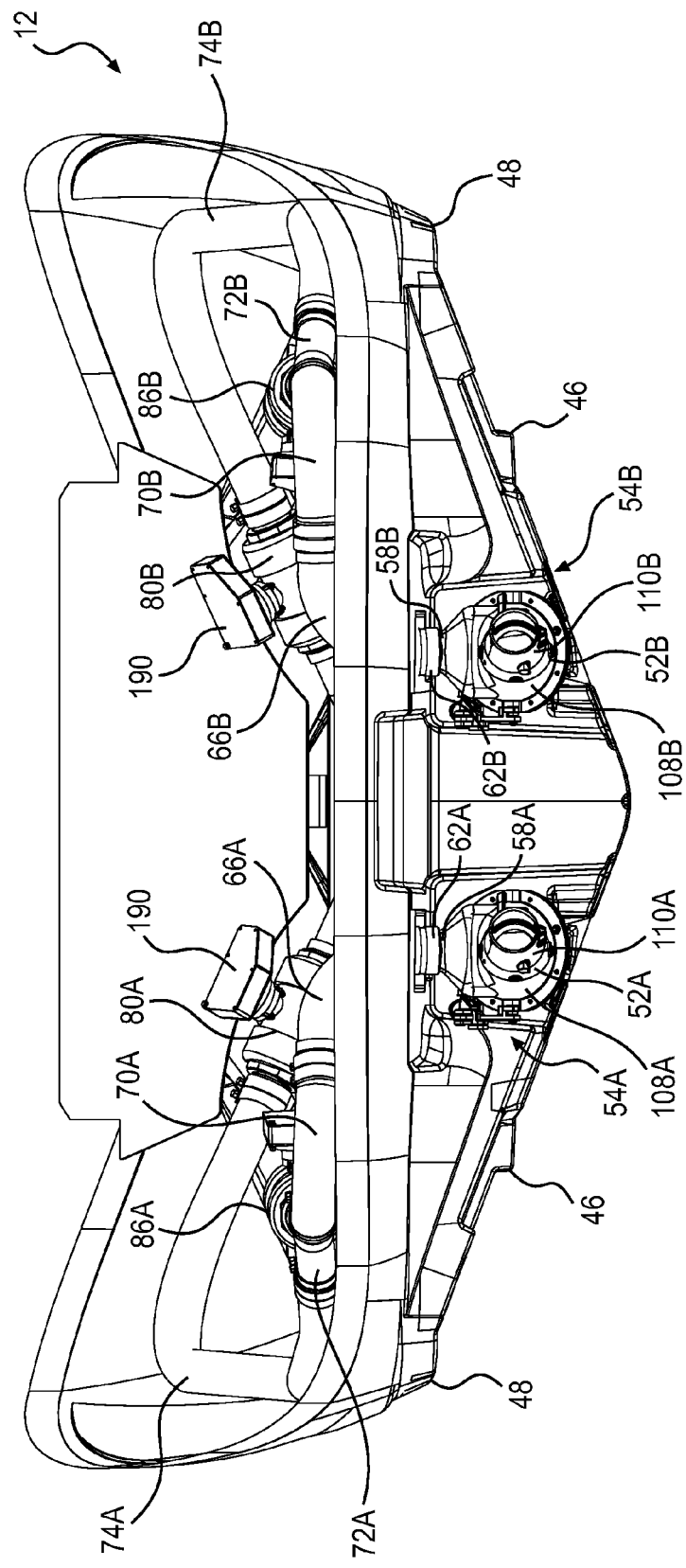
FIG. 5 is a rear elevation view of the hull and of the portions of the steering and thrust control system of FIG. 2.

The jet propulsion unit 52A pressurizes water to create thrust. The water is first scooped from under the hull 12 through an inlet 92 (FIG. 4), which has an inlet grate (not shown). The inlet grate prevents large rocks, weeds, and other debris from entering the jet propulsion unit 52A which may damage the unit 52A or negatively affect performance. The inlet grates could be omitted. Water flows from the inlet 92 through a water intake ramp 94 (FIG. 4).

Figure 3:
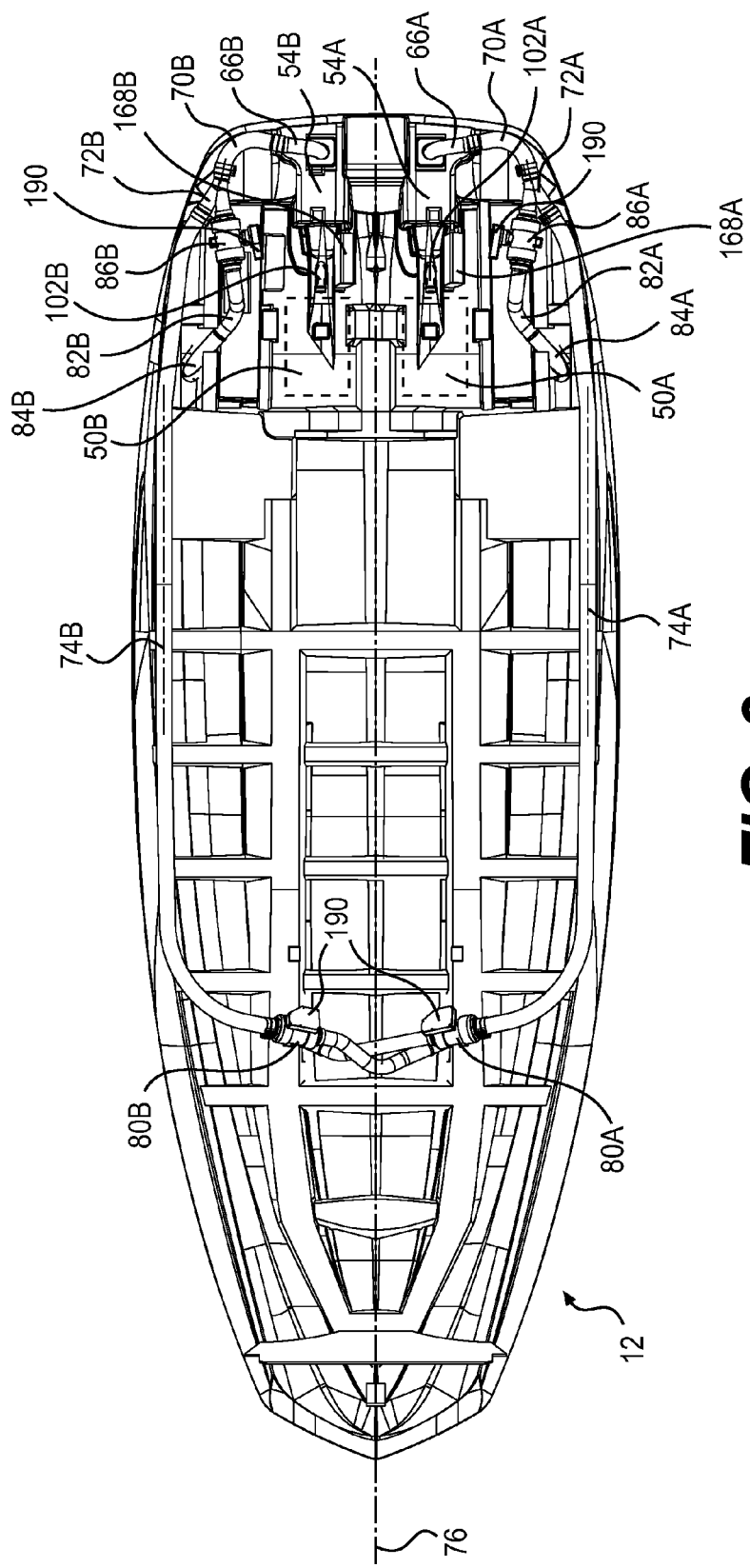
FIG. 3 is a top plan view of the hull and of the portions of the steering and thrust control system of FIG. 2.
Figure 8:
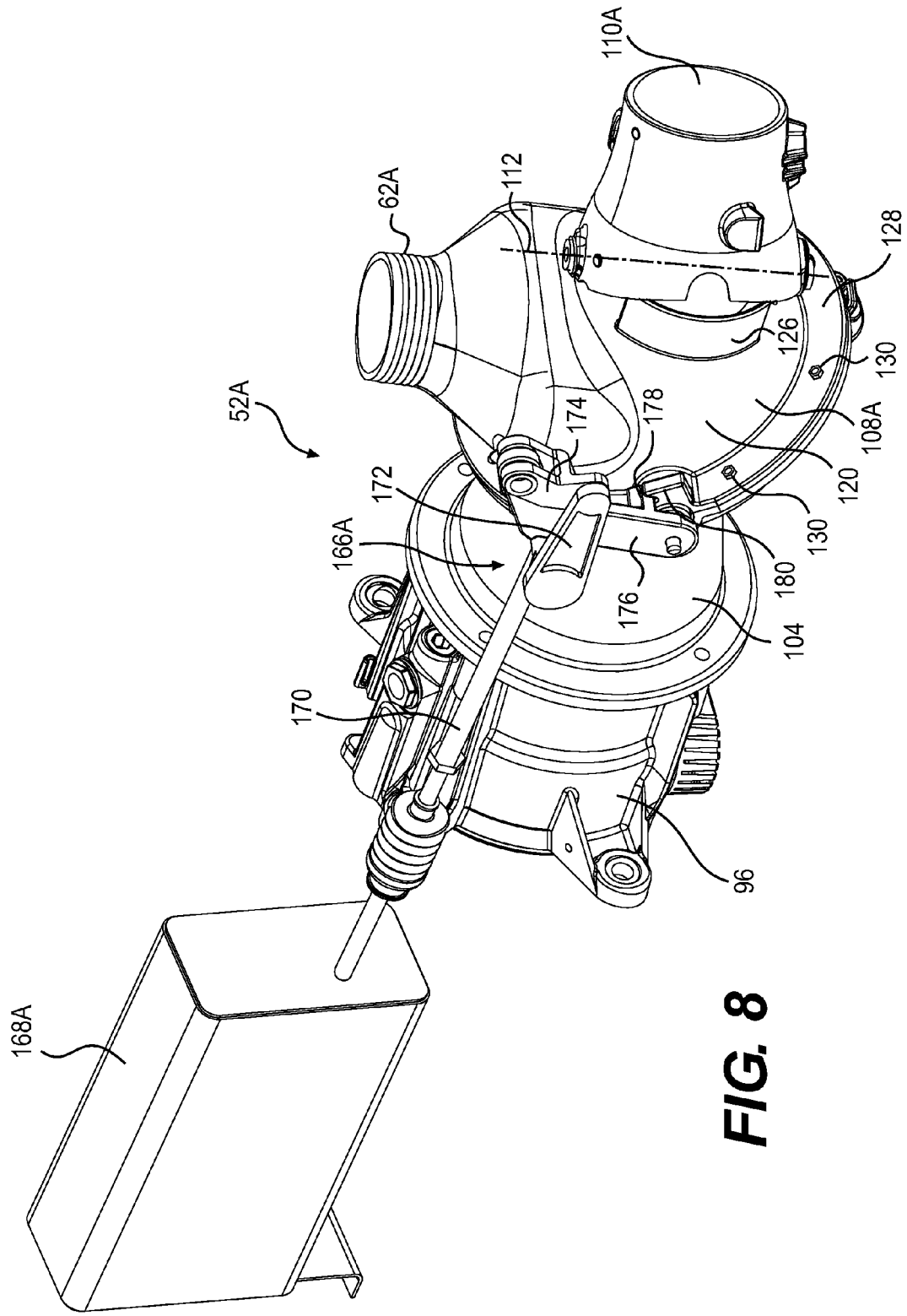
FIG. 8 is a perspective view taken from a rear, left side of a portion of a jet propulsion system of the jet boat of FIG. 1.

From the intake ramp 94, water flows in a pump body 96 (FIG. 8). The forward end of the pump body 96 is connected to a front wall of the tunnel 54A. An impeller 98 and a stator 100 (both schematically shown in FIG. 9) are disposed in the pump body 96. The impeller 98 includes a number of blades (not shown) and is rotatable about an impeller axis 99. The impeller 98 is coupled to the engine 50A by a driveshaft 102A (FIG. 3). The engine 50A powers the impeller 98, which pressurizes the water. The water then moves over the stator 100 that is made of a plurality of fixed stator blades (not shown). The role of the stator blades is to decrease the rotational motion of the water so that almost all the energy given to the water is used for thrust, as opposed to swirling the water. Once the water leaves the pump body 96, it goes through a frustoconical conduit 104. The frustoconical conduit 104 is connected at one end to the rearward end of the pump body 96 and at the other end to an inlet 106 of a valve housing 108A. As can be seen, the frustoconical housing 104 converges from the pump body 96 to the inlet 106 of the valve housing 108. As a result, the water is accelerated further as it flows through the frustoconical conduit 104.

From the inlet 106, water then flows through the outlet 56A and/or through the outlet 58A depending on the position of the valve body 60 as will be described in greater detail below.

When water flows through the outlet 56A, it then flows through a steering nozzle 110A. The steering nozzle 110A is pivotally mounted to the valve housing 108A, so as to pivot about a generally vertical axis 112. The steering nozzle 110A is operatively connected to the steering wheel 36 via a push-pull cable 114 (FIG. 16) such that when the steering wheel 36 is turned, the steering nozzle 110A pivots about the axis 112. This movement redirects the pressurized water coming from the outlet 56A of the valve housing 108A, so as to redirect the thrust and steer the jet boat 10 in the desired direction. It is contemplated that the steering nozzle 110A could be omitted, in which case the jet boat 10 would be steering by other mechanisms or systems. For example, the jet boat 10 may alternatively be steered by one or more rudders, or by having the jet propulsion units 52A and 52B generated different amounts of thrust. Alternatively, it is contemplated that the jet boat 10 could be steered only by discharging water from the discharge ports 78A, 78B, 84A, 84B. It is contemplated that the steering nozzle 110A could also pivot about a horizontal axis to provide trim to the jet boat 10. For example, the steering nozzle 110A could be connected to the valve housing 108A via a gimbal ring permitting movement of the steering nozzle 110A about two axes.

When water flows through the outlet 58A, it then flows through the discharge conduit 62A. From the discharge conduit 62A, the water then flows (via the corresponding pipes) to the discharge port 78A and/or the discharge port 84A depending on the position of the valves 80A and 86A.

The valve housing 108A will now be described in more detail. The valve housing 108A defines a generally spherical chamber 116 therein. The valve body 60 is disposed inside of the chamber 116 as will be described in greater detail below. The valve housing 108A is made of two housing portions 118 and 120. The housing portion 118 defines the inlet 106. The inlet 106 defines an inlet axis 107. In the present embodiment, the inlet axis 107 is coaxial with the impeller axis 99, however it is contemplated that the axes 99 and 107 could be offset and/or skewed relative to each other. The frustoconical conduit 104 is integrally formed with the housing portion 118. However it is contemplated that the frustoconical conduit 104 could be connected to the housing portion 118 via fasteners, welding or other means. The housing portion 118 also has a flange 122.

The housing portion 120 defines the outlets 56A and 58A. The outlet 56A defines an outlet axis 57 and the outlet 58A defines an outlet axis 59. As can be seen, the outlet axis 59 is generally perpendicular to the outlet axis 57 and the outlet 58A is on top of the housing portion 120. It is contemplated that the outlet axis 59 could be disposed at other angles relative to the outlet 57. It is also contemplated that the outlet 58A could be disposed at other positions on the valve housing 108A, such as the sides for example. In the present embodiment, the outlet axis 57 is coaxial with the impeller axis 99 and the inlet axis 107, however it is contemplated that the axis 57 could be offset and/or skewed relative to one or both of the axes 99, 107. The discharge conduit 62A is integrally formed with the housing portion 120. However it is contemplated that the discharge conduit 62A could be connected to the housing portion 120 via fasteners, welding or other means. The housing portion 120 has two tabs 124. The tabs 124 are disposed above and below the outlet 56A. The tabs 124 provide the attachment points to pivotally connect the steering nozzle 110A to the valve housing 108A. The housing portion 120 also has two arcuate flanges 126. The arcuate flanges 126 are disposed on the right and left sides of the outlet 56A. The flanges 126 help direct the flow of water from the outlet 56A into the steering nozzle 110A and help prevent water from flowing in the gap created between the forward edge of the steering nozzle 110A and the housing portion 120 when the steering nozzle 110A is turned, as shown in FIG. 8 for example. The tabs 124 and flanges 126 are welded to the housing portion 120, but it is contemplated that they could be integrally formed with or otherwise connected to the housing portion 120. Similar to the housing portion 118, the housing portion 120 has a flange 128.

To connect the housing portion 118 to the housing portion 120, the flanges 122 and 128 are brought together and fastened using fasteners 130, which in the present embodiment are nuts and bolts. It is contemplated that an elastomeric seal or a sealant could be disposed between the flanges 122, 128 to prevent water from flowing through the seam formed between the flanges 122, 128. The connection between the flanges 122, 128 defines a laterally extending inclined plane 132. It is contemplated that the two housing portions 118, 120 could be shaped such that the plane 132 is disposed at angles other than the one illustrated. For example, the plane 132 could be vertical. It is also contemplated that the plane 132 could extend longitudinally such that the housing portion 118, 120 would define left and right portions of the valve housing 108A instead of front and rear portions as illustrated. It should be understood that in embodiments where the plane 132 is oriented differently than illustrated that the various elements defined by or connected to the housing portions 118, 120 may be defined by or connected to a housing portion 118, 120 which is different from the one described above or may be defined by or connected to both housing portions 118, 120. It is contemplated that the valve housing 108A could be made of more than two housing portions.

Turning now to FIGS. 12 to 15, the valve body 60 used in both jet propulsion units 52A, 52B will be described in more detail. The valve body 60 will be discussed in combination with the jet propulsion unit 52A. Since, the jet propulsion unit 52B is identical to the jet propulsion unit 52A, the arrangement of the valve body 60 in the jet pump unit 52B is the same as in the jet propulsion unit 52A and as such will not be described in detail herein. However, should the jet propulsion unit 52B be different from the jet propulsion unit 52A, it is contemplated that the arrangement of the valve body 60 in the jet pump unit 52B and/or the valve body 60 itself may be different for the jet propulsion unit 52B to accommodate these differences.

The valve body 60 defines a central passage 134 having a passage axis 136. An inlet 138 of the central passage 134 has a greater diameter than an outlet 140 of the central passage 134. The wall forming the central passage 134 is shaped to provide a smooth transition from the diameter of the inlet 138 to the smaller diameter of the outlet 140. As a result, water that flows through the central passage 134, as will be explained in greater detail below, accelerates as it flows from the inlet 138 to the outlet 140. Therefore, in the illustrated embodiment, the valve body 60 is a venturi. It is contemplated that the outlet 140 could have the same or a larger diameter than the inlet 138.

A pair of arcuate deflectors 142 extends from opposite sides of an outer surface of the valve body 60. The deflectors 142 extend from a forward edge 144 to a rearward edge 146 of the valve body 60. The forward and rearward edges 144, 146 are arcuately shaped so as to follow a shape of the chamber 116 in which the valve body 60 is disposed, even as the valve body 60 is rotated in the chamber 116. To help prevent buildup of foreign matter, such as algae, between the valve body 60 and the inner surface of the valve housing 108A, the edges 144 and 146 are spaced from the inner surface of the valve housing 108A. A passage 148 is formed in a top portion of the forward edge 144 of the valve body 60. A recess 150 is formed in the top of the outer surface of the valve body 60 near the rearward edge 146 thereof.

As will be explained in greater detail below, when the valve body 60 is pivoted in the valve housing 108A to the position shown in FIG. 11 or to a position intermediate the position shown in FIG. 9 and the position shown in FIG. 11, such as the position shown in FIG. 10, at least a portion of the water flowing in the chamber 116 from the inlet 106 flows over the portion 152 of the outer surface of the valve body 60 defined between the deflectors 142 and the edges 144, 146 so as to be redirected toward the outlet 58A. The deflectors 142 and the recess 150 assist in deflecting the water toward the outlet 58A when the valve body 60 is in these positions.

The valve body 60 is pivotally supported in the valve housing 108A by shafts 154, 156. The shafts 154, 156 are received in left and right cylinders 158, 160 respectively extending from the portion 152 of the outer surface of the valve body 60. The ends of the shafts 154 are pivotally received in the housing 108A. The shafts 154, 156 are coaxial and define the horizontal valve axis 162 about which the valve body 60 pivots in the valve housing 108A. As can be seen in FIG. 9, the valve axis 162 is disposed in the inclined plane 132 and intersects the impeller axis 99. As such, the valve axis 162 is perpendicular to the impeller axis 99. A portion of the shaft 154 includes splines 164 and extends through the valve housing 108A to be engaged by the actuation mechanism 166A described below used to move the valve body 60 between its various positions.

The actuation mechanism 166A includes a linear actuator 168A (FIG. 8) connected to various linkages. The linear actuator 168A is an electrical linear actuator 168A, however it is contemplated that the linear actuator 168A could be hydraulic or pneumatic. The linear actuator 168A is connected to a rod 170. The end of the rod 170 is fixedly connected to one end of a linkage 172. The other end of the linkage 172 is pivotally connected to a forked linkage 174. A generally L-shaped linkage 176 has one end disposed between the fingers of the forked linkage 174 and pivotally connected thereto (see FIG. 8). The other end of the linkage 176 is splined onto the splines 164 of the shaft 154 of the valve body 60. As a result, linear movement of the rod 170 causes the linkage 176 to pivot, which in turn pivots the valve body 60 between its various positions. The linkages 172, 174, 176 are shaped such that the rod 170 can transmit movement to the valve body 60, but the valve body 60 cannot transmit movement to the rod 70, thereby reducing the mechanical load on the linear actuator 168 due to the forces applied by the water flow on the valve body 60. A leg 178 (FIG. 8) extends behind the linkage 176. When the linkage 176, and therefore the valve body 60, is pivoted clockwise (with reference to FIGS. 9 to 11), the leg 178 eventually abuts a stopper 180 formed by the housing portion 120 to prevent the valve body 60 from moving clockwise beyond the position shown in FIG. 9. It is contemplated that a similar stopper could be provided to limit pivoting of the linkage 176, and therefore the valve body 60, in the counter-clockwise direction beyond the position shown in FIG. 11. It is contemplated that other types of actuation mechanisms could be used. For example, a rotary actuator coupled directly or via gears to the shaft 154 could be used.

The various positions of the valve body 60 in the valve housing 108A will now be described in combination with FIGS. 9 to 11. As would be understood, the valve body 60 is moved between its various positions by using the actuation mechanism 166A. The valve body 60 of the jet propulsion unit 52B can be moved in the same positions in the valve housing 108B.

Figure 9:
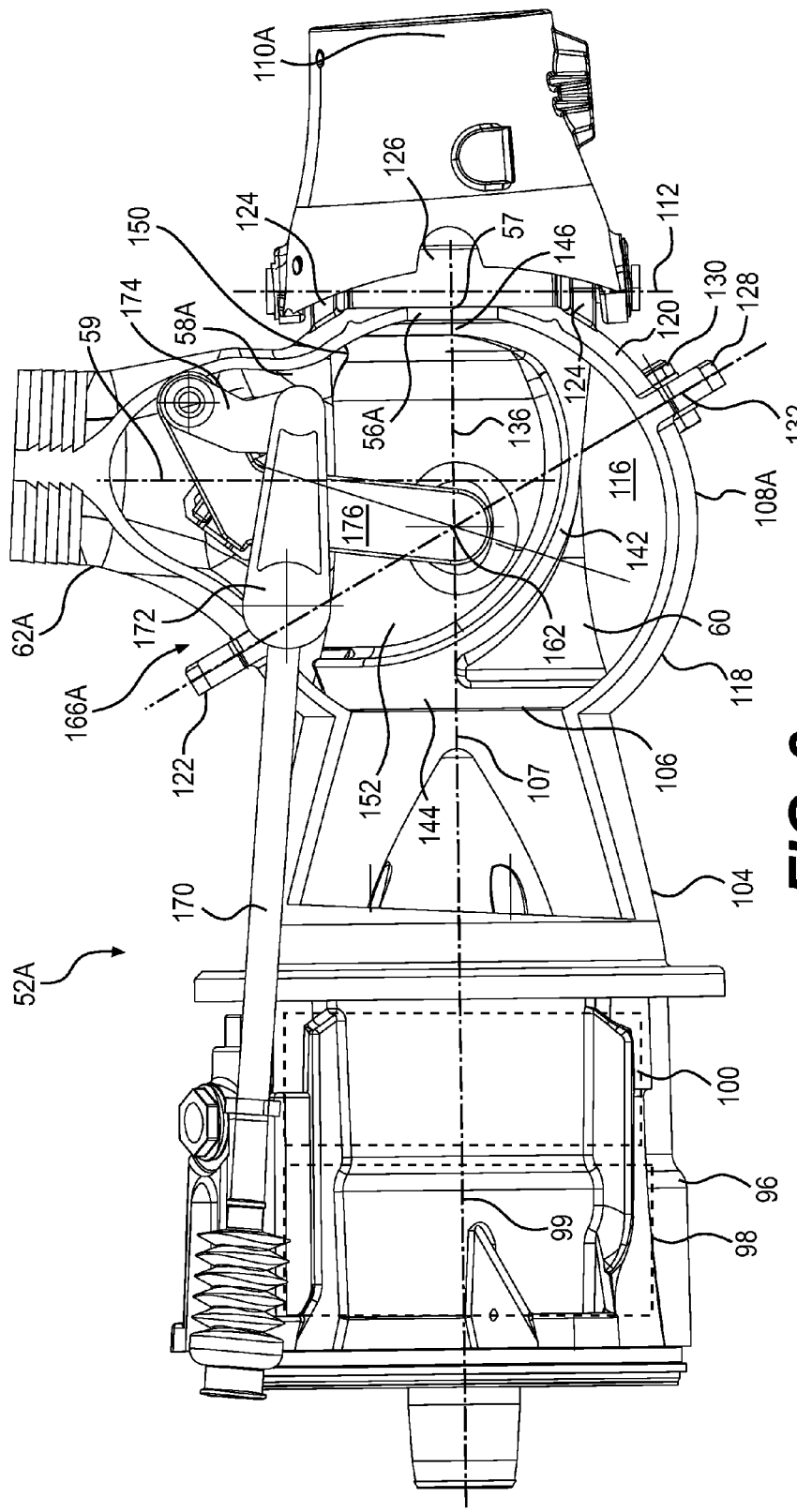
FIG. 9 is a left side elevation view of the portion of the jet propulsion system of FIG. 8 with a section cut out to show a position of a valve body of the jet propulsion system, with the valve body in a forward thrust position.
Figure 10:
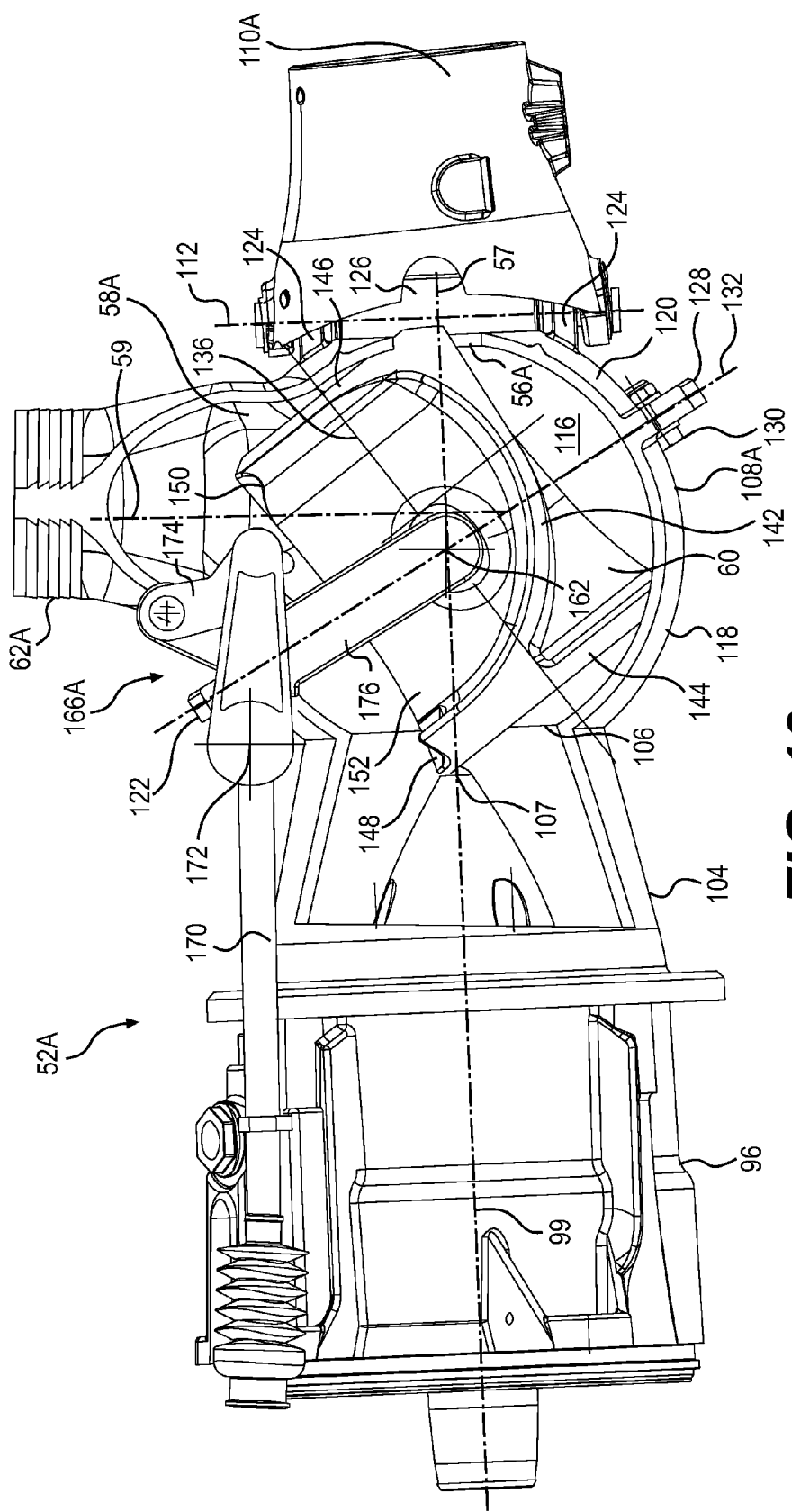
FIG. 10 is a left side elevation view of the portion of the jet propulsion system of FIG. 8 with the section cut out, with the valve body in an intermediate position.

Beginning with FIG. 9, the valve body 60 is oriented such that the passage axis 136 is coaxial with the impeller axis 99, the inlet axis 107 and the outlet axis 47. In this position, water flowing in the valve housing 108A from the inlet 106 flows consecutively through the central passage 134 of the valve body 60, through the outlet 56A, and through the steering nozzle 110A, thus creating a forward thrust which may have a lateral component depending on the position of the steering nozzle 110A. For this reason, the position of the valve 60 illustrated in FIG. 9 is referred to herein as the forward thrust position.

Figure 11:
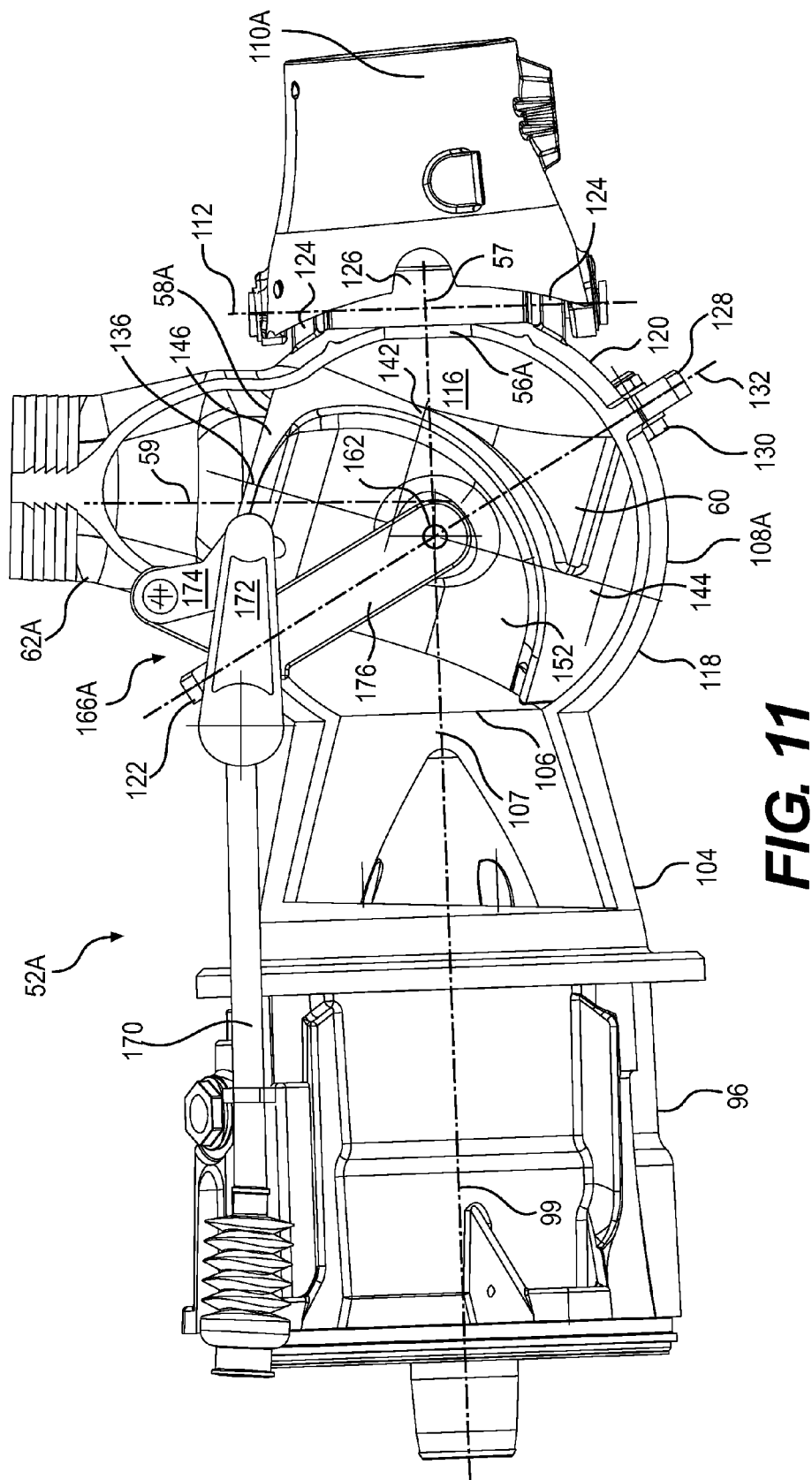
FIG. 11 is a left side elevation view of the portion of the jet propulsion system of FIG. 8 with the section cut out, with the valve body in a thrust control position.
Figure 12:
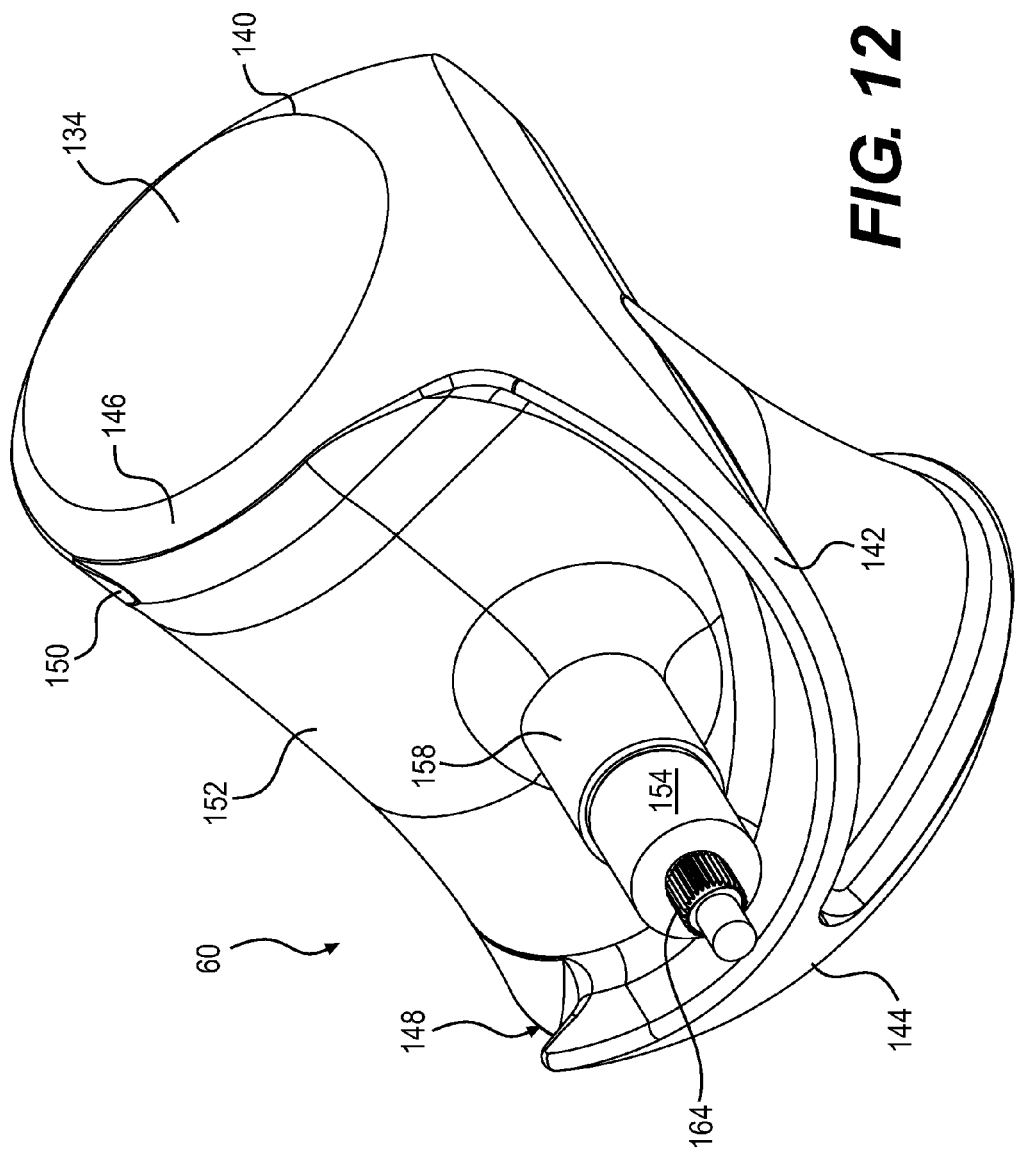
FIG. 12 is perspective view taken from a bottom, rear, left side of the valve body of the jet propulsion unit of FIG. 9.
Figure 13:
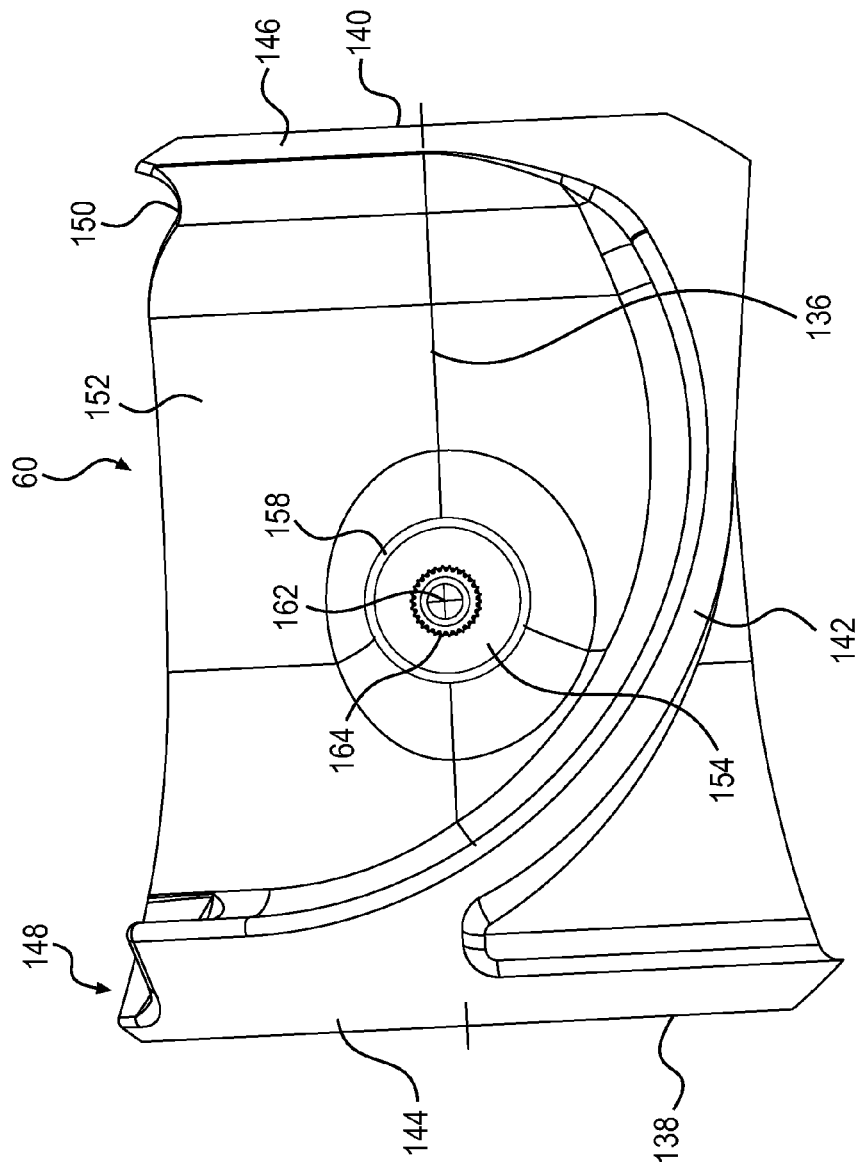
FIG. 13 is right side elevation view of the valve body of the jet propulsion unit of FIG. 9.
Figure 14:
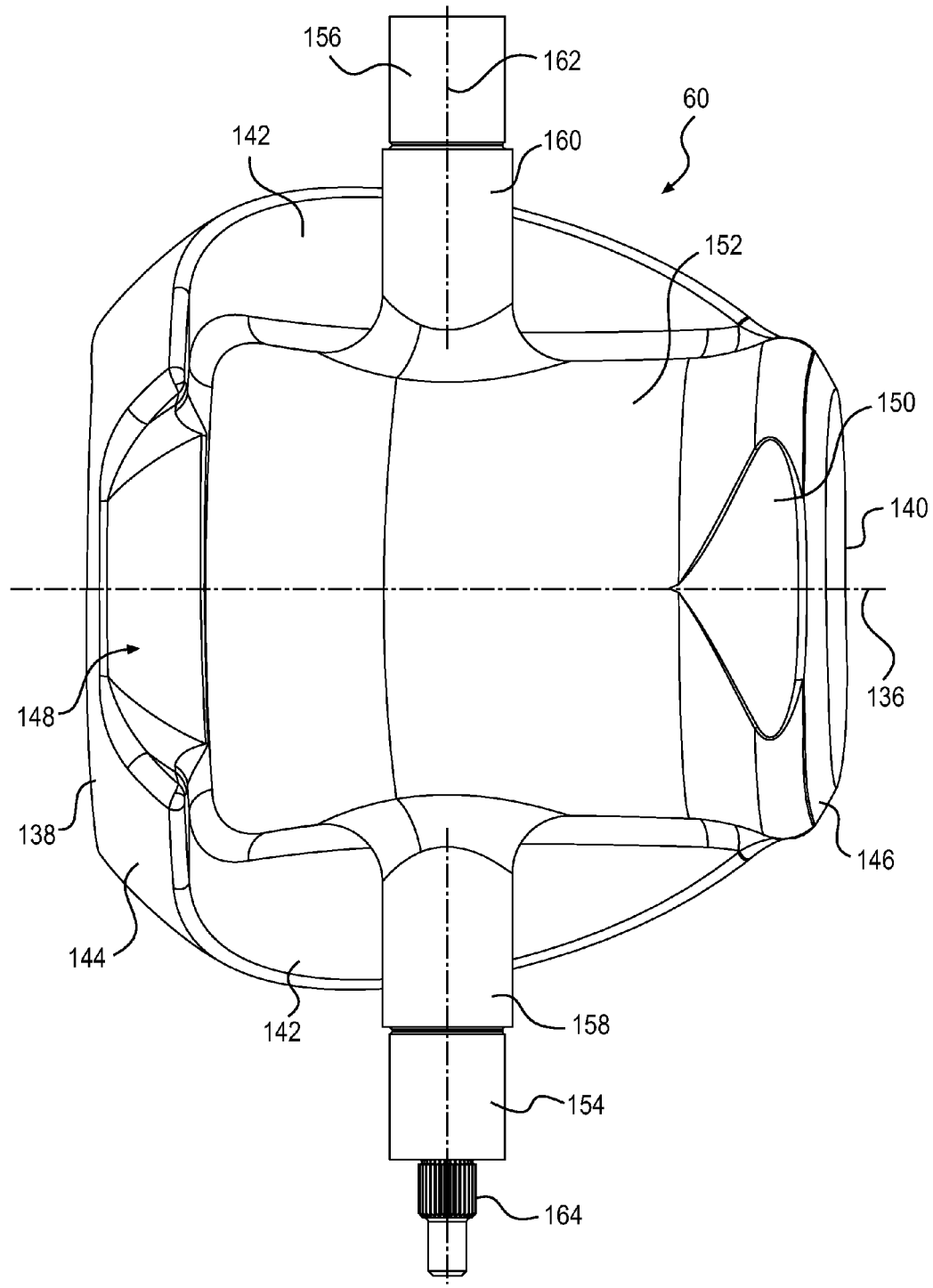
FIG. 14 is top plan view of the valve body of the jet propulsion unit of FIG. 9.
Figure 15:
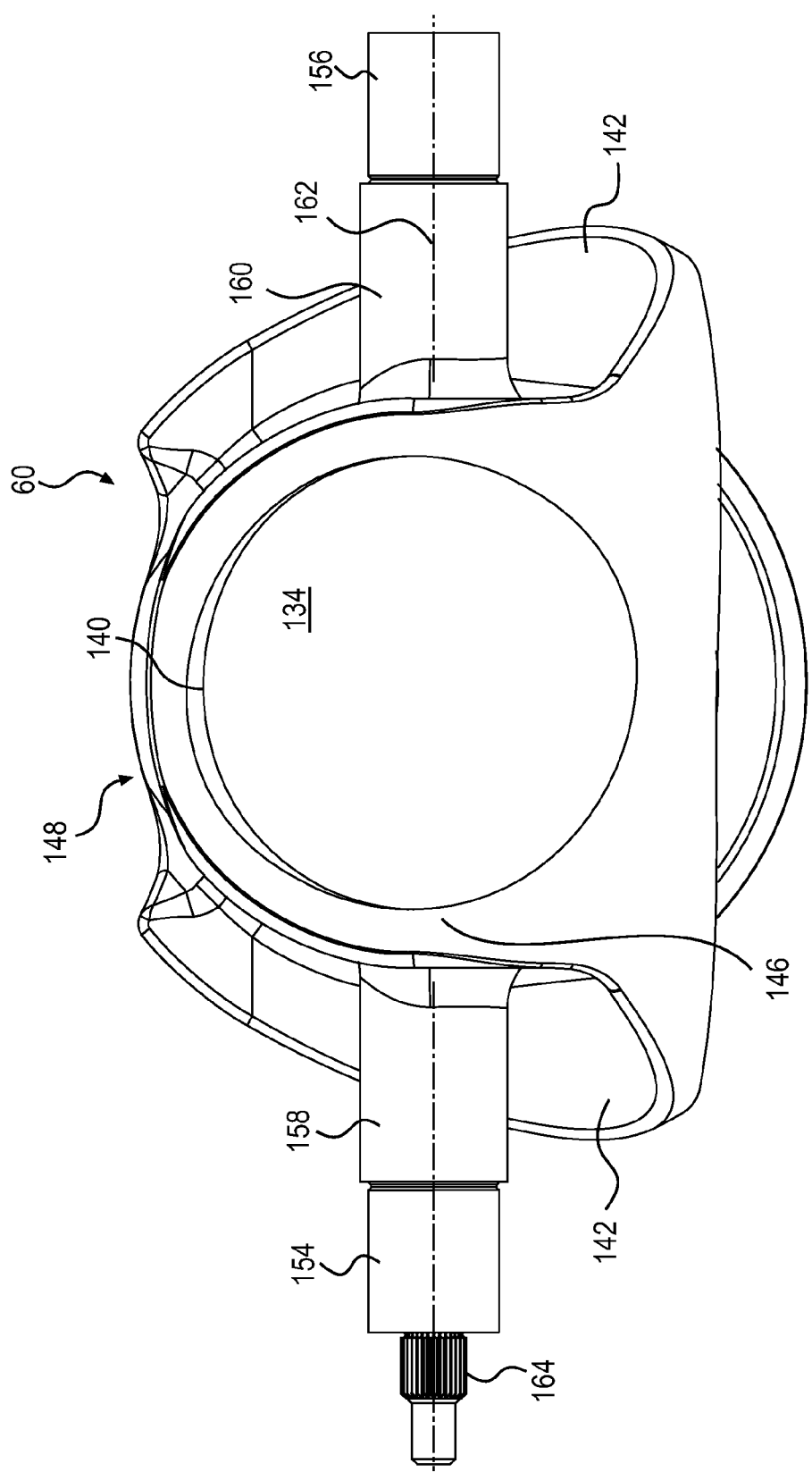
FIG. 15 is rear elevation view of the valve body of the jet propulsion unit of FIG. 9.

By pivoting the valve body 60, the valve can be moved to the position illustrated in FIG. 11. In this position, the passage axis 136 of the valve body is skewed relative to the impeller axis 99, the inlet axis 107 and the outlet axis 47. In this position, water flowing in the valve housing 108A from the inlet 106 flows consecutively over the portion 152 of the outer surface of the valve body 60, through the outlet 58A, the discharge conduit 62A, and with reference to FIG. 6, the flanged collar 64A, the pipe 66A, the elbow 70A, and the Y-shaped pipe 72A. From the Y-shaped pipe 72, a portion of the water flows in the pipe 74A, and if the valve 80A is opened, flows out of the jet boat 10 through the front right discharge port 78A. Another portion of the water flows from the Y-shaped pipe 72A to the pipe 82, and if the valve 86A is opened, flows out of the jet boat 10 through the rear left discharge port 84A. For this reason, the position of the valve 60 illustrated in FIG. 11 is referred to herein as the thrust control position. The deflectors 142 and the recess 150 assist the portion 152 of the outer surface of the valve body 60 in redirecting the water flowing from the inlet 106 toward the outlet 58A. Although some water may flow in the passage 134 of the valve body 60 since the valve body 60 is spaced from the inner surface of the valve housing 108A, due to the position of the valve body 60, this water will not be directed toward the outlet 56A. Also, since the valve body 60 is spaced from the inner surface of the valve housing 108A, some water may flow around the valve body 60 and flow out of the outlet 56A, but the quantity of water is too small and its flow too turbulent to generate a significant amount of forward thrust by being expelled by the steering nozzle 110A.

The valve body 60 can also be pivoted to a number of positions between the forward thrust position of FIG. 9 and the thrust control position of FIG. 11. For this reason, these positions of the valve 60 are referred to herein as intermediate positions. One such position is illustrated in FIG. 10. In an intermediate position, some of the water flowing in the valve housing 108A from the inlet 106 will flow through the passage 134 of the valve body 60 and out of the outlet 56A as described above with respect to FIG. 9, and some of the water flowing in the valve housing 108A from the inlet 106 flows over the portion 152 of the outer surface of the valve body 60 and out of the outlet 58A as described above with respect to FIG. 11. The amount of water flowing out of the each outlet 56A and 58A depends on the position of the valve body 60. The closer the valve body 60 is to the position shown in FIG. 9, the more water will flow out of the outlet 56A. Similarly, the closer the valve body is to the position shown in FIG. 11, the more water will flow out of the outlet 58A.

Figure 16:
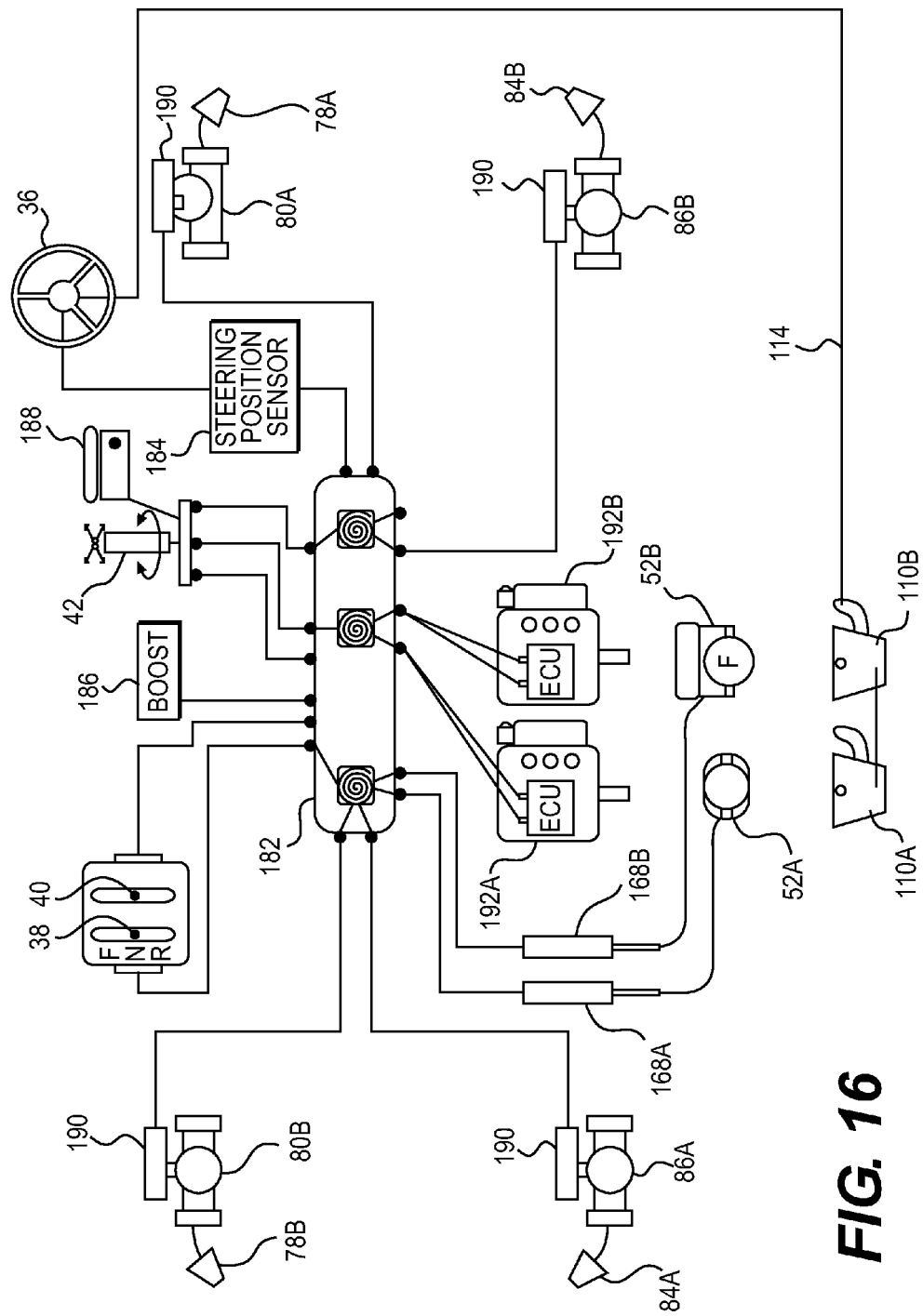
FIG. 16 is a schematic illustration of the steering and thrust control system of the jet boat of FIG. 1.

Turning now to FIG. 16, additional aspects and details of the steering and thrust control system of the jet boat 10 will be described. The transmission lever 38, the throttle lever 40, and the joystick 42 are electrically connected to a controller 182. A steering position sensor 184, operatively connected to the steering wheel 36 to sense a position thereof, is also electrically connected to the controller 182. A boost actuator in the form of a boost switch 186 and an input selector switch 188, the functions of which will be described below, are also electrically connected to the controller 182. The controller 182 is electrically connected to actuators 190 operatively connected to the valves 80A, 80B, 86A, 86B to send signals to the actuators 190 to open or close the valves 80A, 80B, 86A, 86B. In this embodiment, the controllers 190 are electric rotary actuators, but it is contemplated that other types of actuators could be used. The controller 182 is also electrically connected to the actuators 168A, 168B to control the position of the valve bodies 60 in the valve housings 108A, 108B of the jet propulsion units 52A, 52B. The controller 182 is also electrically connected to the engine control units (ECUs) 192A, 192B of the engines 50A, 50B. The ECUs 192A, 192B use the signals from the controller 182 to control the engine speeds of the engines 50A, 50B. It is contemplated that the functions of the controller 182 could be split between multiple controllers and/or could be integrated into functions of the ECUs 192A, 192B. The transmission lever 38, the throttle lever 40, the joystick 42, the steering position sensor 184, the boost switch 186, and the input selector switch 188 provide inputs to the controller 182. The controller 182 uses these inputs to control the positions of the valves 80A, 80B, 86A, 86B and of the valve bodies 60 of the jet propulsion units 52A, 52B, and the speed of the engines 50A, 50B to steer and control the jet boat 10 as will be described below.

The transmission lever 38 has three positions: forward (F), neutral (N), and reverse (R). It should be noted that although the lever 38 is called a transmission lever, it does not actually control a mechanical transmission. Instead, in the present embodiment it lets the driver of the jet boat 10 select the direction in which the jet boat 10 is to move.

When the transmission lever 38 is set to the forward position, the controller 182 sends signals to the actuators 168A, 168B to set both valve bodies 60 of the jet propulsion units 52A, 52B to their forward thrust positions (i.e. the position shown in FIG. 9). The driver can operate the jet boat 10 by turning the steering wheel 36 to steer the jet boat 10 and by adjusting the throttle lever 40 to control the speed of the jet boat 10 as would be the case in most jet boats.

When the transmission lever 38 is set to the reverse position, the controller 182 sends signals to the actuators 168A, 168B to set both valve bodies 60 of the jet propulsion units 52A, 52B to their thrust control positions (i.e. the position shown in FIG. 11). When the steering sensor 184 sends a signal to the controller 182 that the steering wheel 36 is in a position indicative that no turning is desired, the controller sends signals to the actuators 190 of the valves 80A, 80B, 86A, 86B to close the valves 80A, 80B and open the valves 86A, 86B. As a result, thrust is generated at both discharge ports 84A, 84B, as shown by the black arrows in FIG. 19H, and the jet boat 10 moves in a reverse direction, as shown by the white arrow in FIG. 19H. When the steering sensor 184 sends a signal to the controller 182 that the driver desires to turn, the controller 182 to the actuator 190 of one of the valves 80A and 80B to also open this valve. To yaw in a clockwise direction (as seen from above the jet boat 10) while moving in the reverse direction, the valve 80B is opened. To yaw in a counter-clockwise direction (as seen from above the jet boat 10) while moving in the reverse direction, the valve 80A is opened. Based on the position of the control lever 40, the controller 182 sends signals to the ECUs 192A, 192B to control the engines 50A, 50B thereby controlling the amount of thrust generated at the discharge ports 84A, 84B, and when turning, at the discharge port 78A or 78B depending on the direction of the turn. It is contemplated that the jet boat 10 could also be steered in the reverse direction by closing one of the two valves 86A, 86B. It is contemplated that the jet boat 10 could also be steered in the reverse direction by operating the engines 50A, 50B at different engine speeds such that the amount of thrust generated at the discharge port 84A is different from the amount of thrust generated at the discharge port 84B. It is contemplated that the difference in thrust between the discharge ports 84A, 84B could be based on the amplitude of rotation of the steering wheel 36.

When the transmission lever 38 is in the forward or reverse positions, inputs from the joystick 42 are ignored by the controller 182. When the transmission lever 38 is in the neutral position however, the controller 182 ignores inputs from the throttle lever 40 and the steering position sensor 184, and uses the inputs from the joystick 42 to steer and control the jet boat 10. It is contemplated however that the input from the steering position sensor 184 could be used by the controller 182 to compensate from lateral thrusts resulting from the steering nozzles 110A, 110B being turned. As will be explained in greater detail below, the driver of the jet boat 10 can decide to switch to controlling the jet boat 10 by using the steering wheel 36 and the throttle lever 40 when the transmission lever 38 is in the neutral position by actuating the switch 188.

Figure 18:
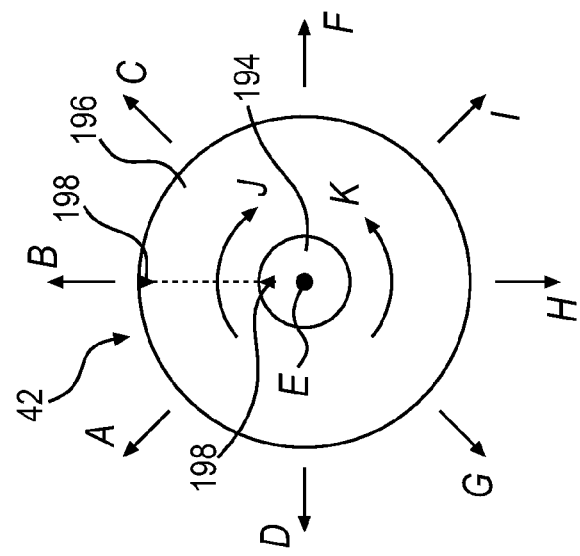
FIG. 18 is a schematic top plan view of the joystick of FIG. 17.
Figure 17:
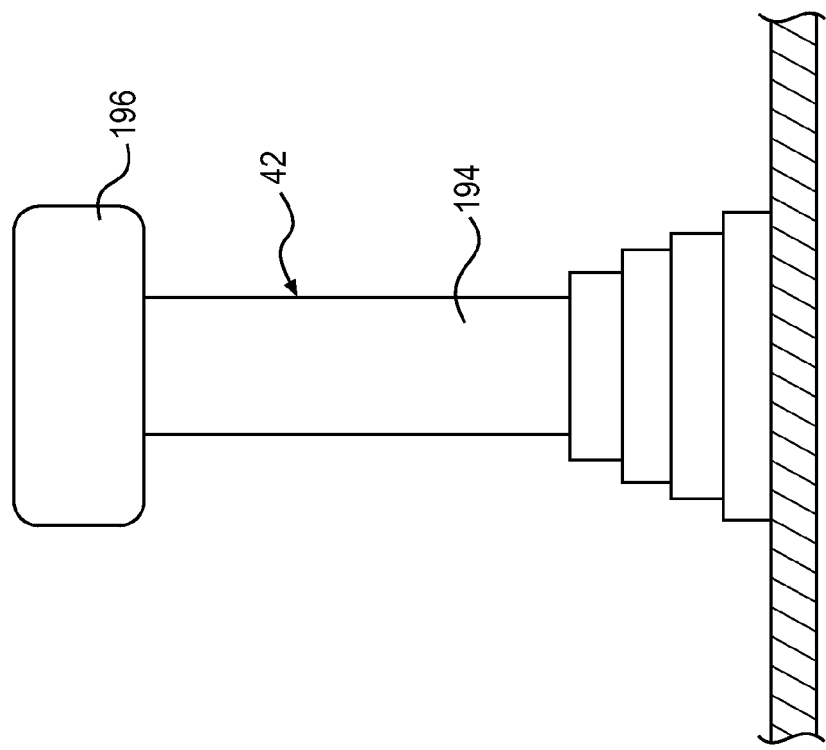
FIG. 17 is a schematic side elevation view of a joystick of the steering and thrust control system of FIG. 16.

As shown in FIGS. 17 and 18, the joystick 42 consists of an arm 194 and a knob 196. The arm 194 is pivotally connected at its lower end such that the joystick 42 can be tilted by the driver of the jet boat 10 in any direction, such as the directions indicated by the arrows A to D and F to I in FIG. 18. The arm 194 is biased such when the driver releases the joystick 42, it returns to its central position illustrated in FIG. 17. Sensors (not shown) sense the direction in which the joystick 42 is tilted and the amount by which it is tilted. As will be explained below, the direction in which the driver tilts the joystick 42 indicates the direction in which the driver wants the jet boat 10 to move, and the amount by which the joystick 42 is tilted indicates the speed at which the driver wants the jet boat 10 to move in that direction. In the present embodiment, the maximum speed that the jet boat 10 can reach when the transmission lever 38 is in the neutral position is limited to be less than the maximum speed that the jet boat 10 can reach when the transmission lever 38 is in the forward position, however it is contemplated that the speed could not be limited when the transmission lever 38 is in the neutral position. The knob 196 is pivotally connected to the upper end of the arm 194. The knob 196 can be turned by the driver of the jet boat 10 in the directions indicated by arrows J and K in FIG. 18. The knob 196 is biased toward a central position indicated by the arrows 198 being aligned by each other, such that the knob 196 returns to this position when the driver releases the knob 196. The arrows 198 are only present for illustrative purposes and may be omitted. Sensors (not shown) sense the direction in which the knob 196 is turned and the amount by which it is turned with respect to the central position. As will be explained below, the direction in which the driver turns the knob 196 indicates the direction in which the driver wants the jet boat 10 to yaw (clockwise or counter-clockwise), and the amount by which the knob 196 is turned from the central position indicates the speed at which the driver wants the jet boat 10 to yaw in that direction.

The manner in which the jet boat 10 can be controlled using the joystick 42 when the transmission lever 38 is in the neutral position will now be described with reference to FIGS. 18 to 19K. In FIGS. 19A to 19K, a black arrow indicates a thrust and a white arrow indicates the direction of movement of the jet boat 10. It should be noted that the black arrows are only indicative of the directions of the thrusts and not of their magnitudes. For the explanations provided below, it is assumed that the jet boat 10 is initially motionless, that the body of water in which the jet boat 10 rests is calm (i.e. no water current), and the steering nozzles 110A, 110B are not turned. In situations where this is not the case, the driver may have to move the joystick 42 (arm 194 and/or knob 196) to compensate in order to obtain the same movement as the one described below. For example, in the case where the boat is parallel to the shore located on its right side, to move laterally towards the shore in the conditions described, the driver only has to tilt the joystick 42 in the direction indicated by arrow F in FIG. 18. However, should a water current exist that pushes the jet boat 10 forward, the driver has to tilt the joystick 42 in the direction indicated by the arrow I, or a position intermediate the directions indicated by the arrows F and I, in order to eliminate the forward motion of the jet boat 10 while moving laterally to the right. It is contemplated that the controller 182 can use the input from the steering position sensor 184 to automatically compensate for the steering nozzles 110A and 110B. It is also contemplated that the steering wheel 36 could turn the steering nozzles 110A, 110B via a steering-by-wire system, in which case the steering nozzles 110A, 110B could be returned to their neutral positions (i.e. not turned) automatically upon the transmission lever 38 being moved to the neutral position.

Figures 19A, 19B, 19C:
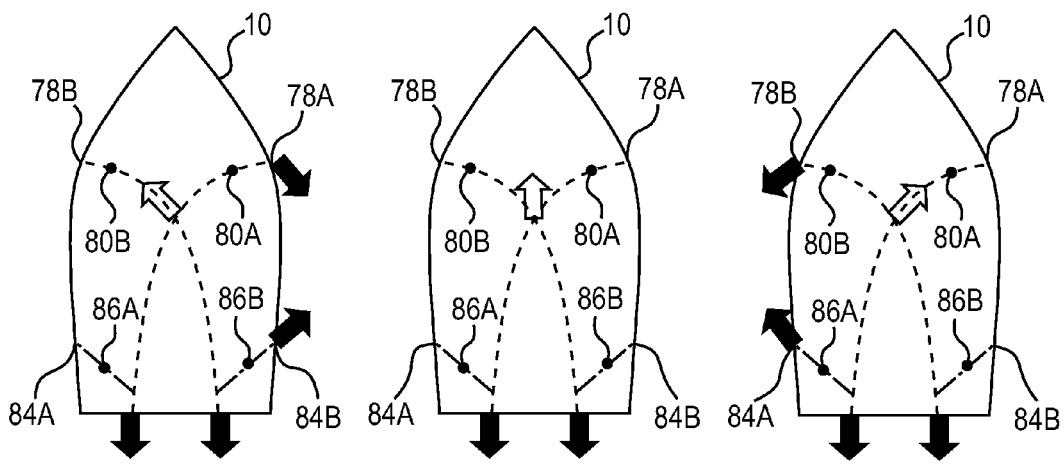
FIG. 19A is a schematic top plan view of the jet boat of FIG. 1 showing the water jets used to move the jet boat diagonally forward and toward the left.
FIG. 19B is a schematic top plan view of the jet boat of FIG. 1 showing the water jets used to move the jet boat forward.
FIG. 19C is a schematic top plan view of the jet boat of FIG. 1 showing the water jets used to move the jet boat diagonally forward and toward the right.

To move the jet boat 10 diagonally forward and toward the left as illustrated in FIG. 19A, the joystick 42 is tilted in the direction indicated by arrow A in FIG. 18 and the knob 196 is not turned. In response, the controller 182 sends signals to the actuators 168A, 168B to move both valve bodies 60 to intermediate positions. The controller 182 also sends signals to the actuators 190 to open the valve 80A, close the valve 80B, close the valve 86A, and open the valve 86B. As a result, the thrusts indicated by the black arrows in FIG. 19A are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

To move the jet boat 10 straight forward as illustrated in FIG. 19B, the joystick 42 is tilted in the direction indicated by arrow B in FIG. 18 and the knob 196 is not turned. In response, the controller 182 sends signals to the actuators 168A, 168B to move both valve bodies 60 to their forward thrust positions. As a result, the thrusts indicated by the black arrows in FIG. 19B are generated. The controller 182 also sends signals to the ECUs 192A, 192B to control the speed of the engines 50A, 50B according to the amount by which the joystick 42 is tilted and such that the engine speeds are the same so that no yaw movement is generated.

To move the jet boat 10 diagonally forward and toward the right as illustrated in FIG. 19C, the joystick 42 is tilted in the direction indicated by arrow C in FIG. 18 and the knob 196 is not turned. In response, the controller 182 sends signals to the actuators 168A, 168B to move both valve bodies 60 to intermediate positions. The controller 182 also sends signals to the actuators 190 to close the valve 80A, open the valve 80B, open the valve 86A, and close the valve 86B. As a result, the thrusts indicated by the black arrows in FIG. 19C are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

Figures 19D, 19E, 19F:
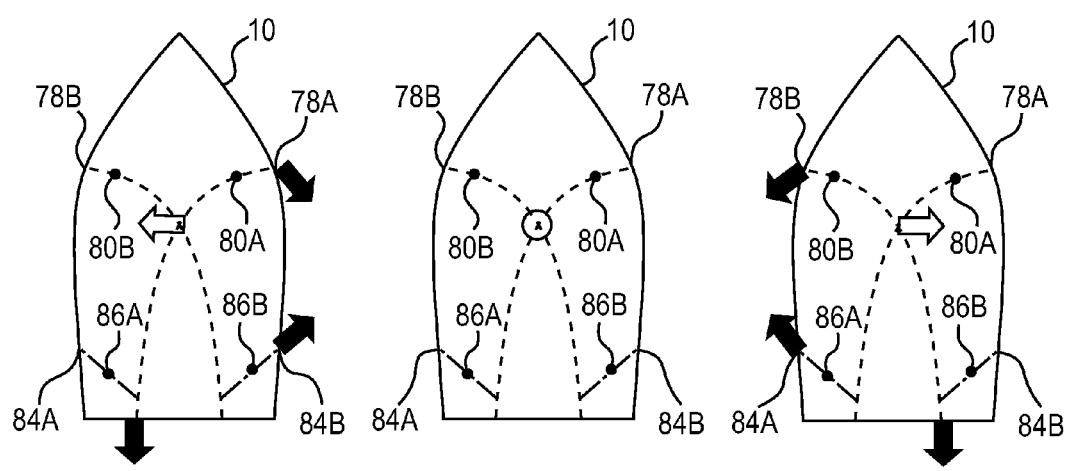
FIG. 19D is a schematic top plan view of the jet boat of FIG. 1 showing the water jets used to move the jet boat laterally toward the left.
FIG. 19E is a schematic top plan view of the jet boat of FIG. 1 showing the water jets used to keep the jet boat in a neutral position.
FIG. 19F is a schematic top plan view of the jet boat of FIG. 1 showing the water jets used to move the jet boat laterally toward the right.

To move the jet boat 10 laterally toward the left as illustrated in FIG. 19D, the joystick 42 is tilted in the direction indicated by arrow D in FIG. 18 and the knob 196 is not turned. In response, the controller 182 sends a signal to the actuators 168A to move the valve body 60 of the jet propulsion unit 52A to an intermediate position and sends a signal to the actuators 168B to move the valve body 60 of the jet propulsion unit 52B to the thrust control position. For some angles α and β, it is contemplated that the valve body 60 of the jet propulsion unit 52A could also be in the thrust control position. The controller 182 also sends signals to the actuators 190 to open the valve 80A, close the valve 80B, close the valve 86A, and open the valve 86B. As a result, the thrusts indicated by the black arrows in FIG. 19D are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

To keep the jet boat 10 in a neutral position (i.e. no movement) as illustrated in FIG. 19E, the joystick 42 is kept in its central position indicated by the point E in FIG. 18 and the knob 196 is not turned. In response, the controller 182 sends signals to the actuators 168A, 168B to move both valve bodies 60 to intermediate positions. The controller 182 also sends signals to the actuators 190 to close the valves 80A, 80B, 86A, and 86B. The controller 182 also sends signals to the ECUs 192A, 192B to control the speed of the engines 50A, 50B to be an idle speed. As a result, only a small amount of forward thrust is generated, which is why no black arrows indicative of thrust have been drawn in FIG. 19E. This small amount of forward thrust is compensated by a small amount of rearward thrust generated by a back flow of water out of the inlets 92 resulting from the valve bodies 60 obstructing the flow of water through the valve housings 108A, 108B. Alternatively, it is contemplated that the controller 182 could sends signals to move both valve bodies 60 to intermediate positions different from the ones used in the controls strategy indicated above and to open only the valves 86A, 86B such that forward thrust generated by the jet propulsion units 52A, 52B is canceled by rearward thrust generated at the discharge ports 84A, 84B.

To move the jet boat 10 laterally toward the right as illustrated in FIG. 19F, the joystick 42 is tilted in the direction indicated by arrow F in FIG. 18 and the knob 196 is not turned. In response, the controller 182 sends a signal to the actuators 168A to move the valve body 60 of the jet propulsion unit 52A to the thrust control position and sends a signal to the actuators 168B to move the valve body 60 of the jet propulsion unit 52B to an intermediate position. For some angles α and β, it is contemplated that the valve body 60 of the jet propulsion unit 52B could also be in the thrust control position. The controller 182 also sends signals to the actuators 190 to close the valve 80A, open the valve 80B, open the valve 86A, and close the valve 86B. As a result, the thrusts indicated by the black arrows in FIG. 19F are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

To move the jet boat 10 diagonally rearward and toward the left as illustrated in FIG. 19G, the joystick 42 is tilted in the direction indicated by arrow G in FIG. 18 and the knob 196 is not turned. In response, the controller 182 sends signals to the actuators 168A, 168B to move both valve bodies 60 to their thrust control positions. The controller 182 also sends signals to the actuators 190 to open the valve 80A, close the valve 80B, open the valve 86A, and open the valve 86B. As a result, the thrusts indicated by the black arrows in FIG. 19G are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

To move the jet boat 10 straight rearward as illustrated in FIG. 19H, the joystick 42 is tilted in the direction indicated by arrow H in FIG. 18 and the knob 196 is not turned. In response, the controller 182 sends signals to the actuators 168A, 168B to move both valve bodies 60 to their thrust control positions. The controller 182 also sends signals to the actuators 190 to close the valve 80A, close the valve 80B, open the valve 86A, and open the valve 86B. As a result, the thrusts indicated by the black arrows in FIG. 19H are generated. The controller 182 also sends signals to the ECUs 192A, 192B to control the speed of the engines 50A, 50B according to the amount by which the joystick 42 is tilted and such that the engine speeds are the same so that no yaw movement is generated.

To move the jet boat 10 diagonally rearward and toward the right as illustrated in FIG. 19I, the joystick 42 is tilted in the direction indicated by arrow I in FIG. 18 and the knob 196 is not turned. In response, the controller 182 sends signals to the actuators 168A, 168B to move both valve bodies 60 to their thrust control positions. The controller 182 also sends signals to the actuators 190 to close the valve 80A, open the valve 80B, open the valve 86A, and open the valve 86B. As a result, the thrusts indicated by the black arrows in FIG. 19I are generated. The controller 182 also sends signals to the ECUs 192A, 192B to control the speed of the engines 50A, 50B according to the amount by which the joystick 42 is tilted and such that the moments generated by the thrusts cancel each other so that no yaw movement is generated.

It should be understood that the jet boat 10 can be moved in directions intermediate the ones indicated above by tilting the joystick 42 in the corresponding directions. In response, the controller 182 sends signals to the actuators 190 of the valves 80A, 80B, 86A, 86B, and to the actuators 168A, 168B of the valve bodies 60 to move the valves 80A, 80B, 86A, 86B and the valve bodies 60 to the positions that provide the desired movement of the jet boat 10. The controller 182 also sends signals to the ECUs 192A, 192B to control the speed of the engines 50A, 50B to provide the thrust necessary to provide the desired movement of the jet boat 10.

To make the jet boat 10 yaw in a clockwise direction as illustrated in FIG. 19J, the joystick 42 is kept in its central position indicated by the point E in FIG. 18 and the knob 196 is turned clockwise as indicated by the arrow J in FIG. 18. In response, the controller 182 sends signals to the actuators 168A, 168B to move both valve bodies 60 to their thrust control positions. The controller 182 also sends signals to the actuators 190 to close the valve 80A, open the valve 80B, close the valve 86A, and open the valve 86B. As a result, the thrusts indicated by the black arrows in FIG. 19J are generated. The controller 182 also sends signals to the ECU 192B to control the speed of the engine 50B according to the amount by which the knob 196 is turned.

To make the jet boat 10 yaw in a counter-clockwise direction as illustrated in FIG. 19K, the joystick 42 is kept in its central position indicated by the point E in FIG. 18 and the knob 196 is turned counter-clockwise as indicated by the arrow K in FIG. 18. In response, the controller 182 sends signals to the actuators 168A, 168B to move both valve bodies 60 to their thrust control positions. The controller 182 also sends signals to the actuators 190 to open the valve 80A, close the valve 80B, open the valve 86A, and close the valve 86B. As a result, the thrusts indicated by the black arrows in FIG. 19K are generated. The controller 182 also sends signals to the ECU 192A to control the speed of the engine 50A according to the amount by which the knob 196 is turned.

The joystick 42 can also be tilted in any direction in combination with a rotation of the knob 196. For example, the joystick 42 can be moved in the direction indicated by arrow B in FIG. 18 while turning the knob 196 clockwise as indicated by the arrow J in FIG. 18 to cause the jet boat 10 to turn right while moving forward in a motion that is similar to the one obtained by turning the steering wheel 36 clockwise when the transmission lever 38 is in the forward position. As a result, the controller 182 sends signals to the actuators 190 of the valves 80A, 80B, 86A, 86B, and to the actuators 168A, 168B of the valve bodies 60 to move the valves 80A, 80B, 86A, 86B and the valve bodies 60 to the positions that provide the desired combined movement of the jet boat 10. The controller 182 also sends signals to the ECUs 192A, 192B to control the speed of the engines 50A, 50B to provide the thrust necessary to provide the desired combined movement of the jet boat 10.

As previously mentioned, the maximum speed that the jet boat 10 can reach when the transmission lever 38 is in the neutral position is limited. However, the jet boat 10 is provided with a boost switch 186 that can be actuated to momentarily increase the speed of the jet boat 10 above this limit when the transmission lever 38 is in the neutral position. Actuating the boost switch 186 sends a signal to the controller 182 which in response sends signals to the ECUs 192A, 192B to momentarily increase the speed of the engines 50A, 50B to increase the various thrusts being generated based on the position of the joystick 42. It is contemplated that the boost switch 186 could be omitted.

As previously explained, the driver of the jet boat 10 can decide to switch to controlling the jet boat 10 by using the steering wheel 36 and the throttle lever 40 when the transmission lever 38 is in the neutral position by actuating the switch 188. When the switch 188 is actuated, inputs from the joystick 42 are ignored by the controller 182. When the switch 188 is actuated and the transmission lever 38 is in the neutral position, turning the steering wheel 36 results in the jet boat 10 moving left or right depending on the direction of rotation of the steering wheel 36.

When the switch 188 is actuated and the transmission lever 38 is in the neutral position, to move the jet boat 10 laterally toward the left, the steering wheel 36 is turned counter-clockwise. In response, the controller 182 sends a signal to the actuators 168A to move the valve body 60 of the jet propulsion unit 52A to an intermediate position and sends a signal to the actuators 168B to move the valve body 60 of the jet propulsion unit 52B to the thrust control position. The controller 182 also sends signals to the actuators 190 to open the valve 80A, close the valve 80B, close the valve 86A, and open the valve 86B. As a result, the thrusts indicated by the black arrows in FIG. 19D are generated. The controller 182 also sends signals to the ECUs 192A, 192B to control the speed of the engines 50A, 50B based on the position of the throttle lever 40 and such that the moments generated by the thrusts cancel each other so that no yaw movement is generated.

When the switch 188 is actuated and the transmission lever 38 is in the neutral position, to move the jet boat 10 laterally toward the right, the steering wheel 36 is turned clockwise. In response, the controller 182 sends a signal to the actuators 168A to move the valve body 60 of the jet propulsion unit 52A to the thrust control position and sends a signal to the actuators 168B to move the valve body 60 of the jet propulsion unit 52B to an intermediate position. The controller 182 also sends signals to the actuators 190 to close the valve 80A, open the valve 80B, open the valve 86A, and close the valve 86B. As a result, the thrusts indicated by the black arrows in FIG. 19F are generated. The controller 182 also sends signals to the ECUs 192A, 192B to control the speed of the engines 50A, 50B based on the position of the throttle lever 40 and such that the moments generated by the thrusts cancel each other so that no yaw movement is generated.

It is contemplated that when the switch 188 is actuated and the transmission lever 38 is in the neutral position, that the signal sent by the controller 182 to the to the ECUs 192A, 192B to control the speed of the engines 50A, 50B could be based on the amount by which the steering wheel 36 has been turned as determined by the steering position sensor 184.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A jet propulsion unit comprising:
a water inlet;
a pump body fluidly connected to the water inlet;
an impeller disposed in the pump body, the impeller being rotatable about an impeller axis; and
a valve assembly fluidly connected to the pump body, the valve assembly comprising:
a valve housing having an inlet fluidly connected to the pump body, a first outlet and a second outlet, the first outlet defining a first outlet axis, the second outlet defining a second outlet axis, and the second outlet axis being at an angle to the first outlet axis; and
a valve body disposed in the valve housing, the valve body being pivotable about a valve axis between a first position and a second position of the valve body, the valve body defining a central passage having a passage axis;
in the first position of the valve body, the passage axis is generally coaxial with the first outlet axis and water from a body of water in which the jet propulsion unit is operated flows consecutively through the water inlet, the pump body, the inlet of the valve housing, the central passage of the valve body and the first outlet of the valve housing, and
in the second position of the valve body, water from the body of water flows consecutively through the water inlet, the pump body, the inlet of the valve housing, the valve housing, and the second outlet of the valve housing.

2. The jet propulsion unit of claim 1, wherein the valve body has a plurality of third positions intermediate the first and second positions where water from the body of water flows consecutively through the water inlet, the pump body, the inlet of the valve housing and the valve housing, and from the valve housing through both the first and second outlets of the valve housing.

3. The jet propulsion unit of claim 1, wherein the valve assembly further comprises a discharge conduit connected to the second outlet of the valve housing.

4. The jet propulsion unit of claim 3, further comprising a steering nozzle pivotally mounted to the valve housing in alignment with the first outlet about a generally vertical axis.

5. The jet propulsion unit of claim 3, wherein the valve assembly further comprises a frustoconical conduit connected between the pump body and the inlet of the valve housing, the frustoconical conduit converging from the pump body to the inlet of the pump housing.

6. The jet propulsion unit of claim 5, wherein:
the valve housing includes a first housing portion fastened to a second housing portion, the first housing portion including the inlet of the valve housing, and the second housing portion including the first and second outlets of the valve housing;
the frustoconical conduit is integrally formed with the first housing portion; and
the discharge conduit is integrally formed with the second housing portion.

7. The jet propulsion unit of claim 1, wherein:
the valve housing includes a first housing portion fastened to a second housing portion, a connection between the first and second housing portions defines a plane; and
the valve axis is disposed in the plane.

8. The jet propulsion unit of claim 1, wherein the valve housing defines a generally spherical chamber.

9. The jet propulsion unit of claim 8, wherein edges of the valve body are arcuately shaped to follow a shape of the spherical chamber.

10. The jet propulsion unit of claim 1, wherein the valve axis is horizontal.

11. The jet propulsion unit of claim 1, wherein the valve axis intersects the impeller axis.

12. The jet propulsion unit of claim 1, wherein the valve body has a shaft, a central axis of the shaft being the valve axis;
wherein a portion of the shaft extends through the valve housing;
the jet propulsion unit further comprising an actuator operatively engaging the portion of the shaft to pivot the valve body between the first and second positions of the valve body.

13. The jet propulsion unit of claim 1, wherein the passage axis is skewed with respect to the axis of the second outlet when the valve body is in the second position.

14. The jet propulsion unit of claim 1, wherein when the valve body is in the second position, water from the body of water flows consecutively from the inlet of the valve housing, over a portion of an outer surface of the valve body and through the second outlet of the valve housing.

15. The jet propulsion unit of claim 14, wherein the valve body includes a pair of deflectors extending from opposite sides of the outer surface of the valve body, the pair of deflectors having the portion of the outer surface therebetween, the pair of deflectors deflecting water toward the second outlet of the valve housing when the valve body is in the second position.

16. The jet propulsion unit of claim 1, wherein:
the valve body is a venturi; and
an inlet of the central passage has a greater diameter than an outlet of the central passage.

17. The jet propulsion unit of claim 1, wherein at least a portion of at least some edges of the valve body are spaced from an inner surface of the valve housing.

18. The jet propulsion unit of claim 1, wherein the second outlet of the valve housing is disposed on a top of the valve housing.

* * * * *